(12) United States Patent
Volzer et al.

(10) Patent No.: US 10,471,617 B2
(45) Date of Patent: Nov. 12, 2019

(54) PIXEL ART CRAYON AND MARKER PHOTO ARRAY ASSEMBLY AND KIT

(71) Applicant: CRAYOLA, LLC, Easton, PA (US)

(72) Inventors: David Volzer, Easton, PA (US);
Douglas A. Brand, Easton, PA (US);
Craig Skinner, Easton, PA (US)

(73) Assignee: Crayola LLC, Easton, PA (US)

( * ) Notice: Subject to any disclaimer, the term of this patent is extended or adjusted under 35 U.S.C. 154(b) by 95 days.

(21) Appl. No.: 15/789,636

(22) Filed: Oct. 20, 2017

(65) Prior Publication Data

US 2018/0065265 A1 Mar. 8, 2018

Related U.S. Application Data

(63) Continuation-in-part of application No. 15/006,116, filed on Jan. 25, 2016, now Pat. No. 10,118,436.
(Continued)

(51) Int. Cl.
*G09B 19/00* (2006.01)
*B26D 3/16* (2006.01)
(Continued)

(52) U.S. Cl.
CPC .............. *B26D 3/16* (2013.01); *B26D 1/0006* (2013.01); *B26D 1/04* (2013.01); *B26D 5/10* (2013.01);
(Continued)

(58) Field of Classification Search
USPC ........ 434/81, 83, 84, 87, 88, 90, 96, 97, 98; 30/109, 111, 114
See application file for complete search history.

(56) References Cited

U.S. PATENT DOCUMENTS

| 96,714 A | * | 11/1869 | Maier ..................... A24F 13/24 30/109 |
| 187,641 A | * | 2/1877 | Kast ........................ A24F 13/24 30/109 |

(Continued)

FOREIGN PATENT DOCUMENTS

DE 4441860 C1 12/1995
EP 0188800 B1 5/1991
(Continued)

OTHER PUBLICATIONS

Plastic Dartboard for Crayone (online). thriftyfun, Aug. 31, 2011 (Aug. 31, 2011) [retrieved Mar. 11, 2016 (Mar. 11, 2016)] Retrieved from the Internet: URL: http://www.thriftyfun.comnfl 9640871.tip.html.

(Continued)

*Primary Examiner* — Kurt Fernstrom
(74) *Attorney, Agent, or Firm* — Shook, Hardy and Bacon LLP

(57) ABSTRACT

Aspects herein are directed to an apparatus and method for creating pixelated artwork composed of coloring element pixels. In some embodiments, a system converts the millions of pixels and colors of a digital image to a simplified color template with numbers assigned to particular colors. In one embodiment, a plastic grid is configured to cover the color template and receives crayons whose arrangement is determined by the numbers/colors of the color template.

11 Claims, 25 Drawing Sheets

Related U.S. Application Data

(60) Provisional application No. 62/262,775, filed on Dec. 3, 2015, provisional application No. 62/108,026, filed on Jan. 26, 2015.

(51) Int. Cl.

| | | |
|---|---|---|
| *B43K 23/016* | (2006.01) | |
| *B44C 1/28* | (2006.01) | |
| *B26D 1/04* | (2006.01) | |
| *B26D 1/00* | (2006.01) | |
| *B26D 5/10* | (2006.01) | |
| *B44B 9/00* | (2006.01) | |
| *G06T 11/60* | (2006.01) | |
| *B44C 3/12* | (2006.01) | |

(52) U.S. Cl.
CPC .............. *B43K 23/016* (2013.01); *B44B 9/00* (2013.01); *B44C 1/28* (2013.01); *G06T 11/60* (2013.01); *B26D 2001/002* (2013.01); *B44C 3/12* (2013.01)

(56) References Cited

U.S. PATENT DOCUMENTS

| | | | | |
|---|---|---|---|---|
| 293,665 | A * | 2/1884 | Myers | A24F 13/24 30/109 |
| 318,995 | A * | 6/1885 | Lilly | A24F 13/24 30/109 |
| 831,533 | A * | 9/1906 | Brunhoff | A24F 13/24 30/109 |
| 964,561 | A * | 7/1910 | Salviolo | A24F 13/24 30/109 |
| 2,521,854 | A * | 9/1950 | King | A24F 19/10 131/233 |
| 4,416,632 | A | 11/1983 | Berman | |
| 4,519,498 | A | 5/1985 | Booth | |
| 4,967,970 | A * | 11/1990 | Michel | B26D 3/26 241/169 |
| 5,035,056 | A * | 7/1991 | Sheffield | B26D 1/553 30/114 |
| 5,257,097 | A | 10/1993 | Pineau et al. | |
| 5,327,257 | A | 7/1994 | Hrytzak et al. | |
| 5,345,320 | A | 9/1994 | Hirota | |
| 5,444,461 | A | 8/1995 | Oz et al. | |
| 5,499,578 | A * | 3/1996 | Payne | A47J 43/18 30/114 |
| 5,555,103 | A | 9/1996 | Anderson | |
| 5,652,031 | A | 7/1997 | Commanda | |
| 5,694,228 | A | 12/1997 | Pearls et al. | |
| 5,704,789 | A | 1/1998 | Yang | |
| 5,793,379 | A | 8/1998 | Lapidous | |
| 5,888,061 | A * | 3/1999 | Reynolds | A24F 13/24 131/249 |
| 5,913,992 | A | 6/1999 | Gerber | |
| 5,960,161 | A | 9/1999 | Bloomberg et al. | |
| 5,971,762 | A | 10/1999 | McKenna et al. | |
| 5,989,033 | A | 11/1999 | Burgio | |
| 6,003,577 | A | 12/1999 | Morito | |
| 6,026,196 | A | 2/2000 | Shannon et al. | |
| 6,128,027 | A | 10/2000 | DeBoer et al. | |
| 6,161,550 | A * | 12/2000 | Kontos | A24F 13/26 131/188 |
| 6,168,438 | B1 | 2/2001 | Leonard | |
| 6,216,346 | B1 * | 4/2001 | Wechsler | A24F 13/26 30/111 |
| 6,252,577 | B1 | 6/2001 | Rashkovskiy et al. | |
| 6,252,996 | B1 | 6/2001 | Putnam | |
| 6,312,101 | B1 | 11/2001 | Couwenhoven et al. | |
| 6,411,730 | B1 | 6/2002 | Bartell et al. | |
| 6,590,574 | B1 | 7/2003 | Andrews | |
| 6,591,010 | B1 | 7/2003 | Russin | |
| 6,727,906 | B2 | 4/2004 | Lockeridge et al. | |
| 6,729,932 | B2 | 5/2004 | Jarvis | |
| 6,778,295 | B1 | 8/2004 | Babulski | |
| 6,791,716 | B1 | 9/2004 | Buhr et al. | |
| 6,856,704 | B1 | 2/2005 | Gallagher et al. | |
| 6,906,826 | B1 | 6/2005 | Kuwata et al. | |
| 6,985,621 | B2 | 1/2006 | Bremsteller | |
| 7,085,006 | B2 | 8/2006 | Yokoyama et al. | |
| 7,095,530 | B2 | 8/2006 | Mantell et al. | |
| 7,136,189 | B2 | 11/2006 | Sharma et al. | |
| 7,159,787 | B2 | 1/2007 | Fukushima | |
| 7,205,995 | B1 | 4/2007 | Hod et al. | |
| 7,242,799 | B1 | 7/2007 | Bremsteller | |
| 7,444,027 | B2 | 10/2008 | Anderson | |
| 7,486,413 | B2 | 2/2009 | Eliav et al. | |
| 7,502,150 | B2 | 3/2009 | Gotoh et al. | |
| 7,554,540 | B2 | 6/2009 | Hayes | |
| 7,654,023 | B2 | 2/2010 | Peters et al. | |
| 7,715,050 | B2 | 5/2010 | Topfer et al. | |
| 7,832,106 | B2 * | 11/2010 | Drake | B26D 3/169 30/112 |
| 7,916,940 | B2 | 3/2011 | Hel-Or | |
| 7,938,928 | B2 | 5/2011 | Torres Candela | |
| 8,150,151 | B2 | 4/2012 | Gori et al. | |
| 8,233,740 | B2 | 7/2012 | Roth | |
| 8,260,080 | B1 | 9/2012 | Wilensky | |
| 8,374,424 | B2 | 2/2013 | Dietz | |
| 8,379,047 | B1 | 2/2013 | DiVerdi | |
| 8,463,035 | B2 | 6/2013 | Bechtel et al. | |
| 8,485,200 | B1 * | 7/2013 | Levinger | A24F 47/00 131/248 |
| 8,494,303 | B2 | 7/2013 | Watanabe et al. | |
| 8,625,892 | B2 | 1/2014 | Nakamura | |
| 8,830,242 | B2 | 9/2014 | DiVerdi et al. | |
| 8,922,548 | B2 | 12/2014 | Randall et al. | |
| 9,320,330 | B2 | 4/2016 | Cooke et al. | |
| 2002/0154143 | A1 | 10/2002 | Maier | |
| 2005/0063014 | A1 | 3/2005 | Shinotsuka | |
| 2005/0257797 | A1 * | 11/2005 | Taylor | A24F 13/26 131/248 |
| 2005/0281480 | A1 | 12/2005 | Baldwin | |
| 2006/0077210 | A1 | 4/2006 | Morris et al. | |
| 2007/0250197 | A1 | 10/2007 | Glass et al. | |
| 2008/0018750 | A1 | 1/2008 | Oh et al. | |
| 2008/0089577 | A1 | 4/2008 | Wang | |
| 2009/0243893 | A1 | 10/2009 | Filliatre et al. | |
| 2010/0177353 | A1 | 7/2010 | Fischer et al. | |
| 2010/0178448 | A1 | 7/2010 | Nakajima | |
| 2010/0194780 | A1 | 8/2010 | Acworth | |
| 2011/0276643 | A1 | 11/2011 | Fischman et al. | |
| 2013/0065201 | A1 | 3/2013 | Pool et al. | |
| 2013/0189650 | A1 | 7/2013 | Lee et al. | |
| 2014/0120501 | A1 | 5/2014 | Cooke et al. | |

FOREIGN PATENT DOCUMENTS

| | | |
|---|---|---|
| EP | 0713788 B1 | 12/1999 |
| EP | 1540733 B1 | 7/2008 |
| EP | 1711352 B1 | 11/2012 |
| FR | 2676300 A1 | 11/1992 |
| FR | 2733940 A1 | 11/1996 |
| GB | 1390977 A | 4/1975 |
| GB | 2127753 A | 4/1984 |
| JP | 2003315984 A | 11/2003 |
| WO | 2005006641 A1 | 1/2005 |
| WO | 2005075216 A1 | 8/2005 |

OTHER PUBLICATIONS

International Preliminary Report on Patentability dated Aug. 10, 2017 in International Patent Application No. PCT/US2016/014938, 6 pages.

International Search Report and Written Opinion dated Apr. 8, 2016 for PCT Patent Application No. PCT/US1614938, 14 Pages.

The Amazing Crayon Art of Christian Faur (online). AmusingPlanet, Nov. 17, 2009 (Nov. 17, 2009) [retrieved Mar. 10, 2016 (Mar. 10, 2016)]. Retrieved from the Internet: URL http://www.amusingplanet.com/2009/11/amazing-crayon-art-of-christian-faur.html.

(56) References Cited

OTHER PUBLICATIONS

Non-Final Office Action dated Dec. 20, 2017 in U.S. Appl. No. 15/006,116, 8 pages.
Examination Report dated Apr. 6, 2018 in Canadian Patent Application No. 2,961,895, 4 pages.
Examination Report dated May 7, 2018 in Australian Patent Application No. 2016211685, 3 pages.
Final Office Action dated Jul. 3, 2018 in U.S. Appl. No. 15/006,116, 7 pages.
Notice of Allowance dated Sep. 7, 2018 in U.S. Appl. No. 15/006,116, 5 pages.
Notice of Allowance dated Nov. 19, 2018 in Canadian Patent Application No. 2,961,895, 1 page.
Examination Report dated Dec. 10, 2018 in Australian Patent Application No. 2016211685, 5 pages.
Examination report No. 3 dated Mar. 8, 2019 in Australian Patent Application No. 2016211685, 6 pages.

\* cited by examiner

PIXEL ART CRAYON AND MARKER PHOTO ARRAY ASSEMBLY AND KIT

CROSS-REFERENCE TO RELATED APPLICATION

This application is a continuation in part of U.S. Nonprovisional patent application Ser. No. 15/006,116, entitled "Pixel Art Crayon And Marker Photo Array Assembly and Kit," filed Jan. 25, 2016, which claims priority to U.S. Provisional Patent Application No. 62/108,026, entitled "Pixel Art Crayon Photo Array," filed Jan. 26, 2015, and U.S. Provisional Patent Application No. 62/262,775, entitled "Pixel Art Crayon Photo Array," filed Dec. 3, 2015, the entire contents of all of which are hereby incorporated by reference.

SUMMARY

Aspects herein are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, an apparatus, kit, and method for creating pixelated artwork comprised of colored "pixels," such as a pixelated image assembled from crayons, crayon segments, markers, marker end plugs, marker caps, ink, ink portions, and the like. In some aspects, a pixel art crayon and/or marker photo array assembly or kit may refer to a frame structure configured to secure multiple crayons, portions of crayons, markers, and/or marker end plugs in a specific configuration and according to a specific pixel-assigned layout associated with a user image, such as a user's photo having various colors that are assigned specific pixel colors corresponding to a particular coloring element (i.e., a crayon, a marker end plug, an ink color, etc.). The apparatus may further include a display structure, such as a framed box, that acts as an enclosure and/or frame, and a pixelated image template corresponding to a user-submitted image. In further aspects, a grid structure may be provided, such as a transparent plastic grid having a number of circular openings configured to receive crayons, and an assortment of crayons having colors corresponding to the pixel-assigned template, according to one aspect herein.

Embodiments of a method to create a pixel art crayon photo array include the following steps: 1) the user uploads a photo to a server, 2) software on the server converts the photo to a pixelated image template and assigns numbers corresponding to specific regions of color on the original photo to the appropriate regions on the pixelated template, 3) each number is assigned to a particular crayon color, 4) the user downloads the pixelated template from the server, prints the template, and places the template in the bottom of a framed box, 5) the transparent plastic grid is placed over the template, and 6) crayons corresponding to the various numbers on the template are placed in the holes of the grid forming the pixels of the artwork.

Aspects herein also include providing a kit that includes the framed box and transparent plastic grid and directions to upload/download images to/from the server along with directions on how to obtain the correct number and colors of crayons. Other embodiments include providing modular frames and crayon-holding grids to allow the user to assemble a frame and grid of a size of their choice. One method of assembling the modular frame and crayon-holding array is via snap/fit construction. In further embodiments, a grid structure for securing additional coloring elements is provided, such as a structure for assembling marker end plugs in an orientation corresponding to a pixel-assigned user image. In yet another embodiment, a pixel-assigned user image may provide a template background for a substrate configured to receive application of ink having specific colors corresponding to the template image.

DESCRIPTION OF THE DRAWINGS

Illustrative aspects herein are described in detail below with reference to the attached drawing figures, and wherein.

DETAILED DESCRIPTION

Figure 1:
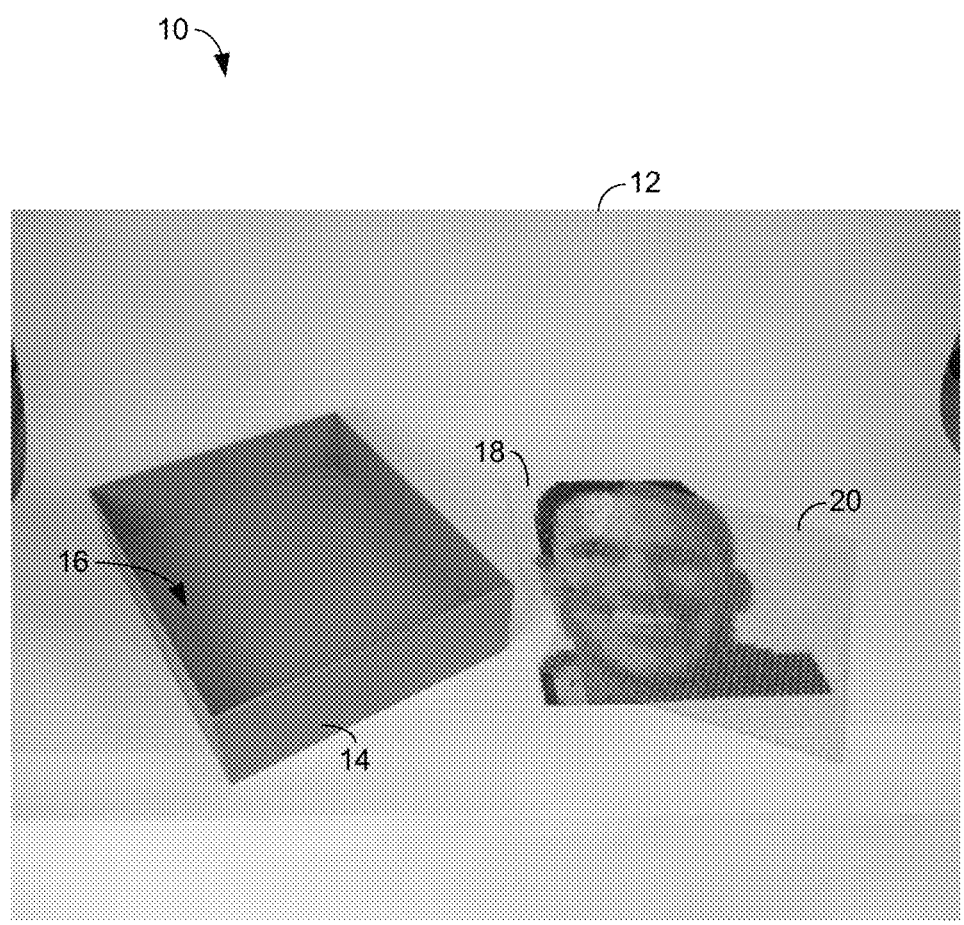
FIG. 1 illustrates a top perspective view of an unassembled pixel art crayon photo array, in accordance with aspects herein.

The subject matter of aspects herein is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Aspects herein include, among other things, an apparatus, kit, and method for creating pixelated artwork comprised of colored "pixels," such as a pixelated image assembled from crayons, crayon segments, markers, marker end plugs, marker caps, ink, ink portions, and the like. In some aspects, a pixel art crayon and/or marker photo array assembly or kit may refer to a frame structure configured to secure multiple crayons, portions of crayons, markers, and/or marker end plugs in a specific configuration and according to a specific pixel-assigned layout associated with a user image, such as a user's photo having various colors that are assigned specific pixel colors corresponding to a particular coloring element (i.e., a crayon, a marker end plug, an ink color, etc.). The apparatus may further include a display structure, such as a framed box, that acts as an enclosure and/or frame, and a pixelated image template corresponding to a user-submitted image. In further aspects, a grid structure may be provided, such as a transparent plastic grid having a number of circular openings configured to receive crayons, and an assortment of crayons having colors corresponding to the pixel-assigned template, according to one aspect herein.

Embodiments of a method to create a pixel art crayon photo array include the following steps: 1) the user uploads a photo to a server, 2) software on the server converts the photo to a pixelated image template and assigns numbers corresponding to specific regions of color on the original photo to the appropriate regions on the pixelated template, 3) each number is assigned to a particular crayon color, 4) the user downloads the pixelated template from the server, prints the template, and places the template in the bottom of a framed box, 5) the transparent plastic grid is placed over the template, and 6) crayons corresponding to the various numbers on the template are placed in the holes of the grid forming the pixels of the artwork.

Aspects herein also include providing a kit that includes the framed box and transparent plastic grid and directions to upload/download images to/from the server along with directions on how to obtain the correct number and colors of crayons. Other embodiments include providing modular frames and crayon-holding grids to allow the user to assemble a frame and grid of a size of their choice. One method of assembling the modular frame and crayon-holding array is via snap/fit construction. In further embodiments, a grid structure for securing additional coloring elements is provided, such as a structure for assembling marker end plugs in an orientation corresponding to a pixel-assigned user image. In yet another embodiment, a pixel-assigned user image may provide a template background for a substrate configured to receive application of ink having specific colors corresponding to the template image.

Accordingly, a device 10 for generating a pixel art crayon photo array of a user-supplied digital image may include using crayons as the pixel components, as shown in the exemplary embodiments of FIGS. 1-8. In one embodiment, a kit 12 including a shallow box or frame 14, either pre-assembled or requiring assembly of one or more pieces by a user, and a transparent plastic grid 20 designed to fit inside the frame 14, may be provided. As such, the device 10 may include one or more components for generating a pixel art crayon photo array, such as a frame 14 having an interior cavity 16, a pixelated image template 18 with numbers assigned to areas of related colors within the array image, and a plastic grid 20 with holes designed to accept and secure crayons in an array orientation.

Figure 4:
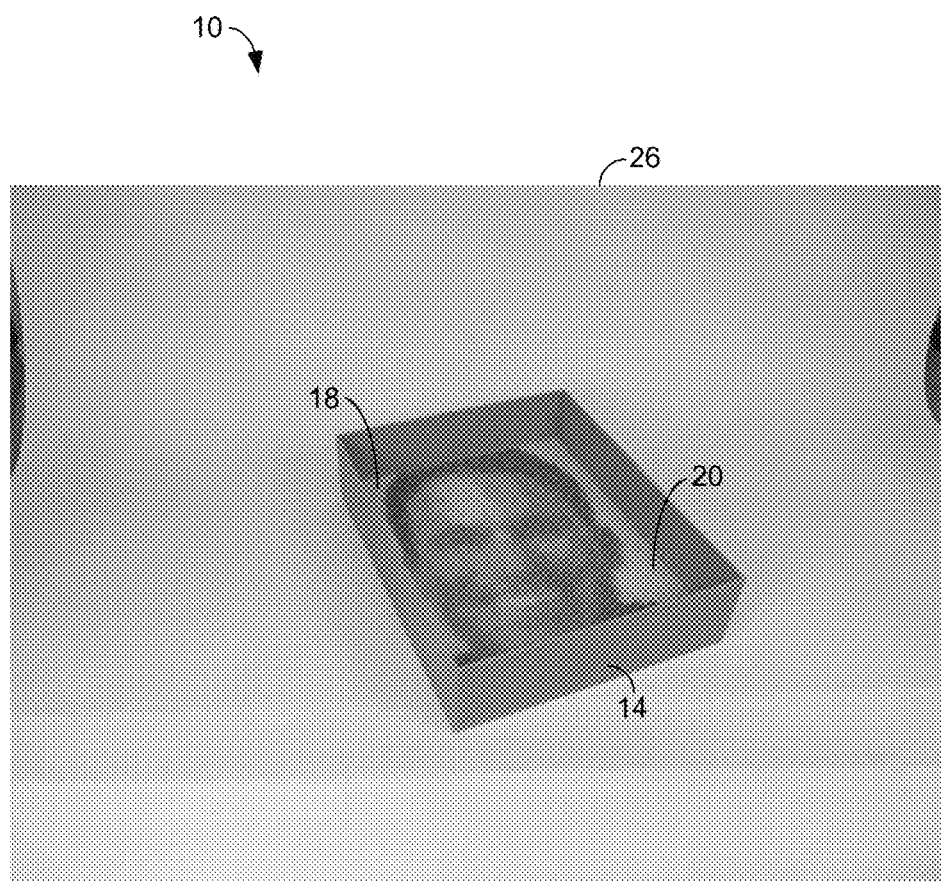
FIG. 4 illustrates a top perspective view of a partially assembled pixel art crayon photo array, in accordance with aspects herein.
Figure 5:
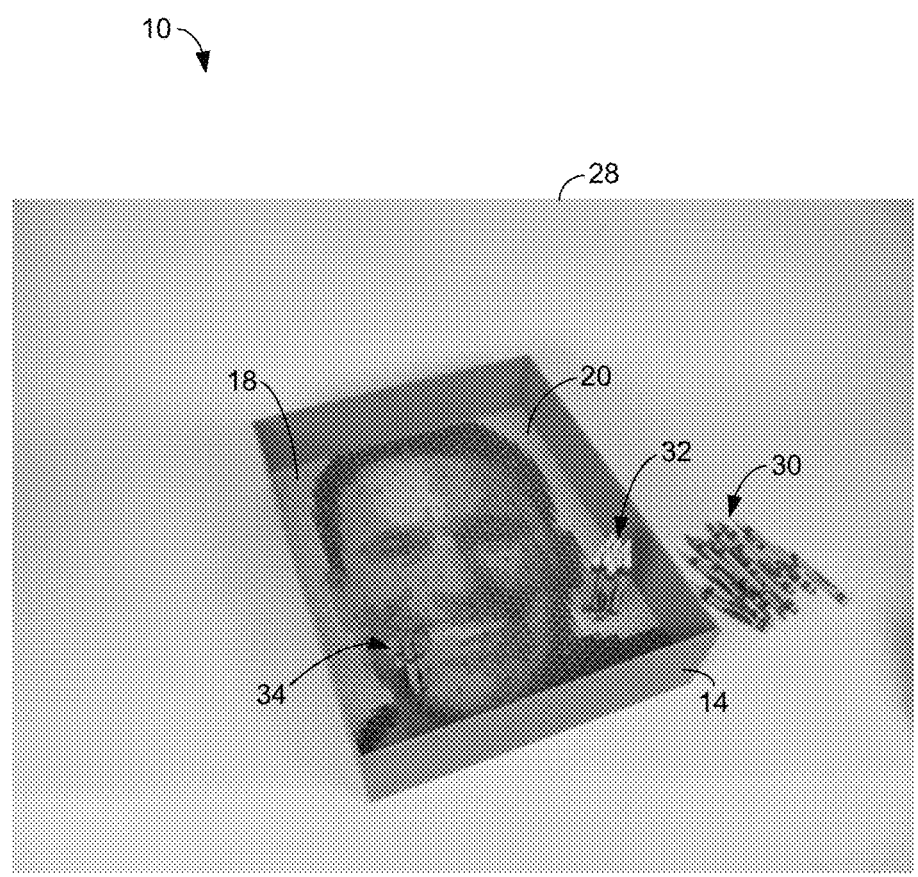
FIG. 5 illustrates a top perspective view of a partially assembled pixel art crayon photo array including crayons being received by openings in the transparent plastic grid, in accordance with aspects herein.

In one embodiment, the transparent plastic grid 20 may be arrayed with many openings configured to receive a colored crayon. For example, the transparent plastic grid 20 may include an array of openings that are round, cylindrical, triangular, oblong, oval, square, and/or an additional shape oriented along an axis that is configured to correspond to a shape of a coloring element, such as a crayon body, with round openings and/or cylindrical slots that receive and hold crayons in a particular position corresponding to the pixelated image template 18. As such, a frame 14 may be configured to secure the pixelated image template 18 in a first position 22 (FIG. 2), prior to receiving the overlaid grid 20 structure in a second position 24 (FIG. 3), with the openings of the grid 20 adjacent and corresponding to the pixels assigned in the template 18 in the third position 26 (FIG. 4).

In one embodiment, the arrangement of the openings in the grid 20 structure may be such that all slots align vertically and horizontally with all adjacent slots. In another aspect, the arrangement of slots may be such that even numbered rows of slots are offset slightly horizontally with respect to the slots in each odd numbered row. In this manner, the slots in each odd numbered row may align vertically with the slots in all other odd numbered rows, such as in a "honeycomb" configuration. Likewise, the slots in each even numbered row may align vertically with the slots in all other even numbered rows. In some aspects, the size of the slots may be optimal for receiving and securing a standard-sized crayon body, such as the plurality of crayon bodies 30 in FIG. 5. In some aspects, the pixelated image template 18 includes colors corresponding to the plurality of crayon bodies 30, such as the first crayon color 32 and the second crayon color 34. As such, gradient pixel assignments 36 may be applied to various portions of a template 18 such that the resulting crayon pixel image includes crayon bodies 30 that replicate the coloration of the original template 18, as shown in the comparison view of FIG. 6. Based on assembling the plurality of crayon bodies 30 within the frame 14, and according to the pixels of the template 18 and the positioning mechanism of the grid 20. Accordingly, the final artwork may be composed entirely of crayons to form a pixelated crayon image 38, as in FIG. 7, that when viewed from a perspective in FIG. 8, maintains an image resolution 40 utilizing the crayon body 30 tips within the pixelated crayon image 38.

Aspects herein also include a process for producing pixelated crayon artwork. In the illustrative embodiment of FIG. 9, exemplary components of a pixel art system 50 are provided. In this example, the pixel art system 50 includes a receiving component 52 for receiving a desired pixel-art image, such as a user-submitted photo or other image for generating a pixelated template. As such, the user content component 54 provides one or more items of content received by the receiving component 52, which may then be analyzed by the determining component 56 for pixel color assignment by the pixel color assignment component 58. Based on the pixels assigned to a particular image, including the color, shading, gradient, brightness, or other aspects of coloring analysis carried out during pixel color assignment, a template generating component 60 may be used to provide a template for generating pixel art. Such template for the pixel art system 50 may include a printed template provided on a surface, such as paper, that may be placed in association with one or more assembly devices for assembling the desired pixel art.

Figure 9:
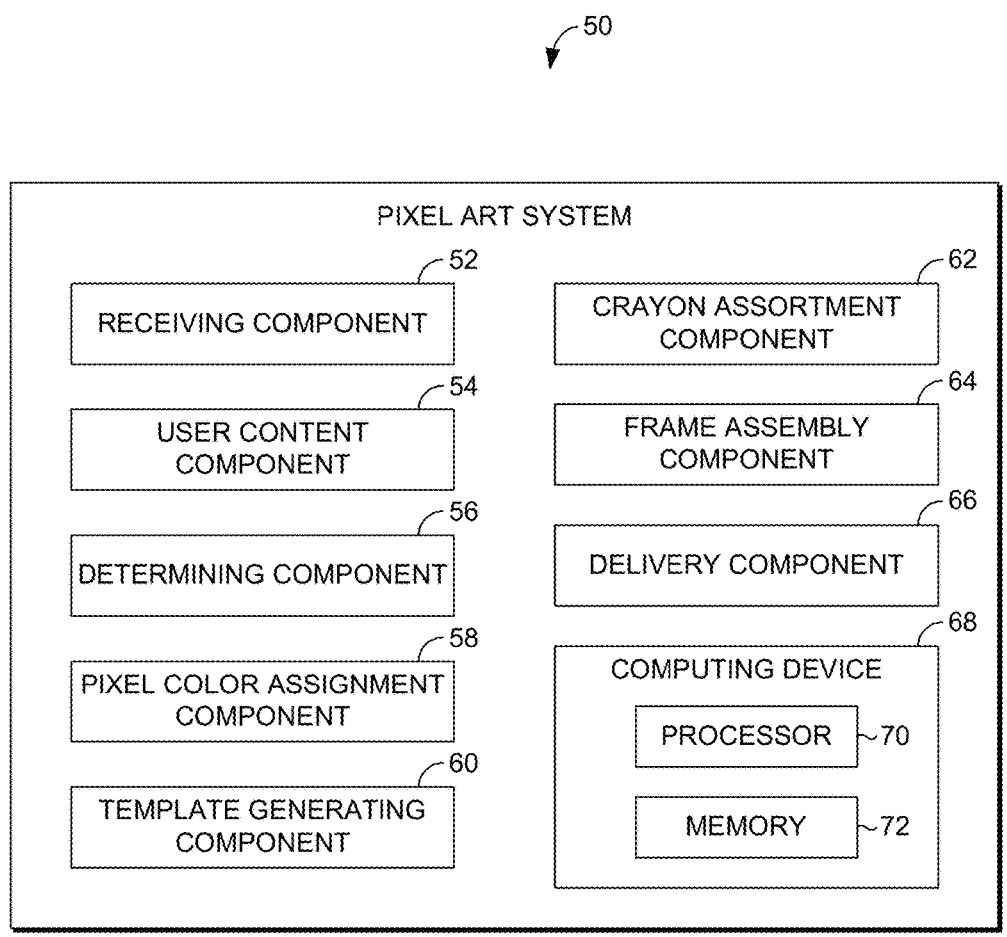
FIG. 9 is a diagram of the components of the pixel art system, in accordance with aspects herein.

Accordingly, having assigned specific pixel colors to a particular image and generating a template for the desired artwork, a crayon assortment component 62 may be used to generate a desired number of crayon bodies having colors corresponding to a determined number of crayons needed to satisfy the generated template. Additionally, a frame assembly component 64 may provide a frame assembly corresponding to the generated template, and according to the crayon assortment, or other desired coloring element provided by the pixel art system 50. In further aspects, a delivery component 66 may provide one or more features and/or outputs of the pixel art system 50, such as providing a completed kit including a set of desired coloring elements (e.g., crayon bodies), with a generated pixel art template and a frame assembly component having at least one grid structure for assembling the pixel art product. In further aspects, as shown in the example of FIG. 9, a computing device 68 may be accessed, having a processor 70 and a memory 72, for performing one or more functions of the pixel art system 50, such as determining pixels associated with received user content, assigning pixel colors to a determined user image, and/or generating a template based on the assigned pixel colors for a particular image.

Figure 10:
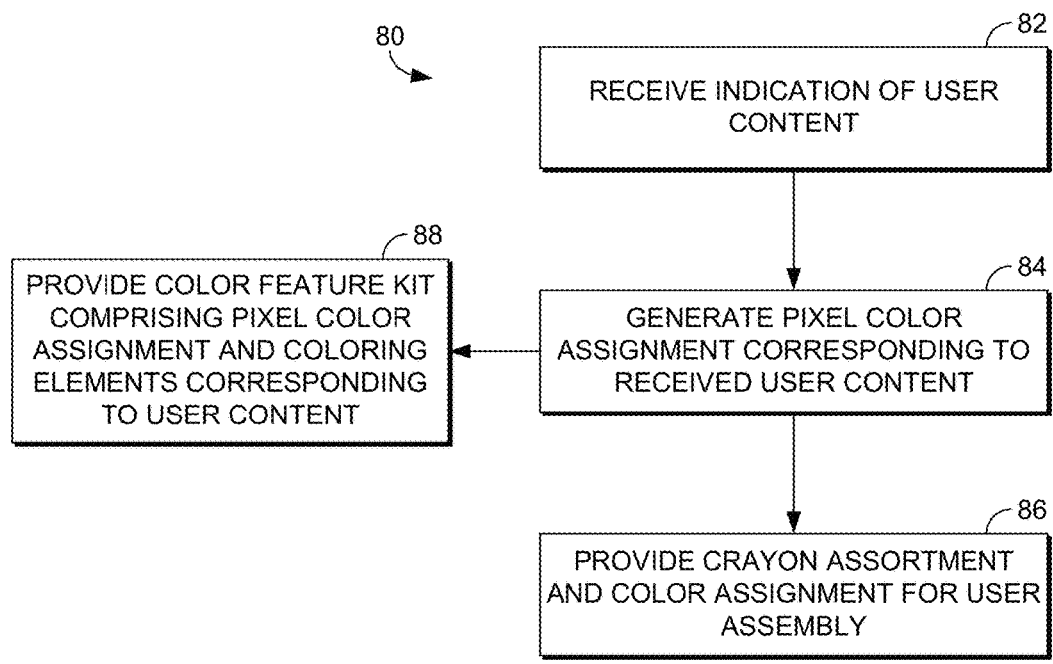
FIG. 10 illustrates a method of converting a user image into a pixel art crayon photo array kit, in accordance with aspects herein.

In the illustrative example of FIG. 10, a method 80 of generating a pixel-assigned coloring template is provided. At block 82, an indication of user content is received. For example, a pixel art system or service may receive a user-submitted image, such as a photo, for generating pixel art using crayons, markers, ink, or another coloring element that provides variable colored features for aligning with a pixel-assigned template. At block 84, a pixel color assignment corresponding to the received user content is generated. In some embodiments, the color assignment may be generated according to a finite number of coloring options, such as a finite number of colors within a certain range, hue, tone, or coloration. In one aspect, a grayscale assignment feature may be utilized to assign one of multiple colors of gray coloring elements to a particular feature of a pixelated image, such as a first shade of a grey to a lighter portion of an image and a second shade of grey to a darker portion of an image. In further aspects, one of multiple coloring options may be assigned via the pixel color assignment, such as a range of colors within a specific tone, shade, or tint applied to an image.

At block 86, in one aspect herein, the crayon assortment and color assignment are provided for user assembly, according to the pixel assignment of block 84. For example, for a pixel-assigned image including at least ten segments with a first shade of red, at least ten crayon bodies having a first red shade may be included in the crayon assortment. Similarly, a template generated to present the color assignment to the user may be provided, such as a coloring template having pixel assignment and corresponding to the grid assembly structure (e.g., holes in a grid assembly mechanism).

In further aspects herein, at block 88, a color feature kit comprising pixel color assignment and coloring elements corresponding to the user content are provided. For example, a color feature kit may include a template identifying the pixels assigned to the various colors identified in the user-submitted content, such as the range of assigned colors in a user photo. Additionally, the coloring elements corresponding to the assigned pixels may also be included, such as a series of marker end plugs having the corresponding colors that provide a sufficient number and shade of coloring elements to complete the desired pixel art. In one embodiment, the coloring feature kit may include one or more grid structures for assembling a pixel art structure, such as a grid structure for supporting a crayon body, or a material matrix for supporting an ink coloring, as further discussed below.

Figure 11:
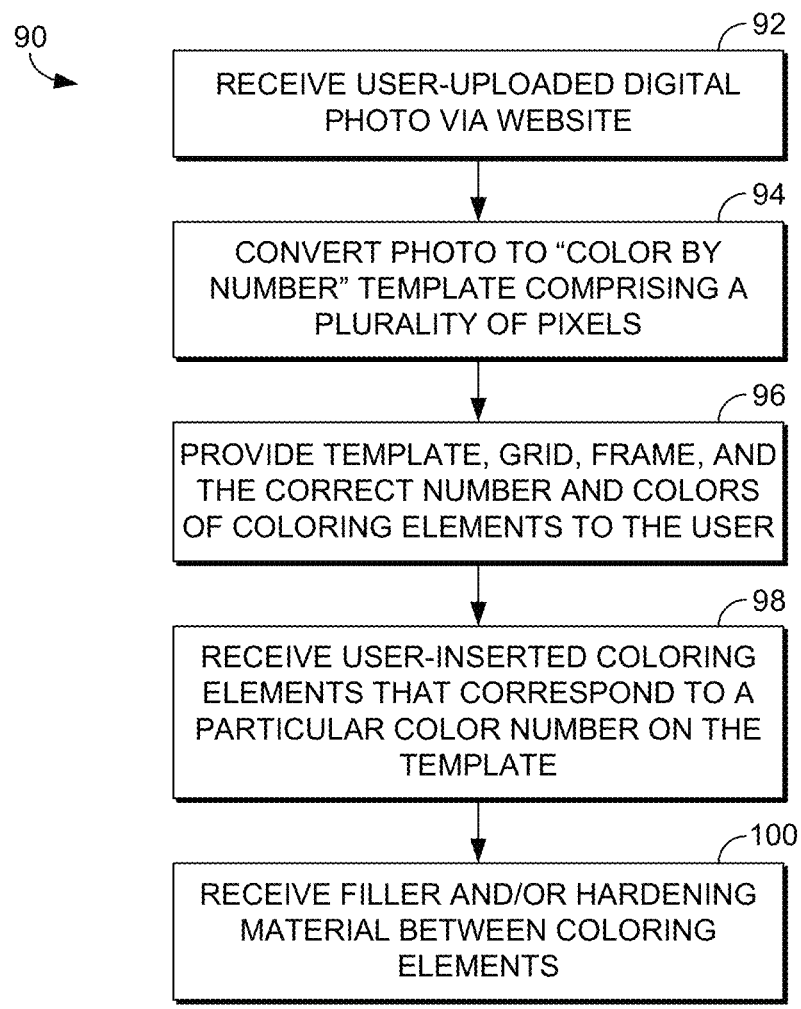
FIG. 11 illustrates a method of creating a pixel art crayon photo array, in accordance with aspects herein.

In further embodiments, as shown in FIG. 11, a method 90 for creating a pixel art crayon photo array is provided. In one embodiment, a user image is received, such as a user-uploaded digital photo received via a website, at block 92. In another embodiment, a digital image is provided to a server via a website. At block 94, a photo is converted to a "color by number" template comprising a plurality of pixels. In further aspects, a computer program (e.g., a software component of the pixel art system) converts the uploaded image into a "color-by-number" style template. Pre-defined dimensions of the final artwork frame may be used to determine the number of crayon-sized pixels that will be used, according to one embodiment. In some aspects, pixel colors may be limited to a particular number of color values, such as 128 different color values corresponding to the number of different crayon colors offered, for example, by Crayola LLC, Easton, Pa.

Figure 2:
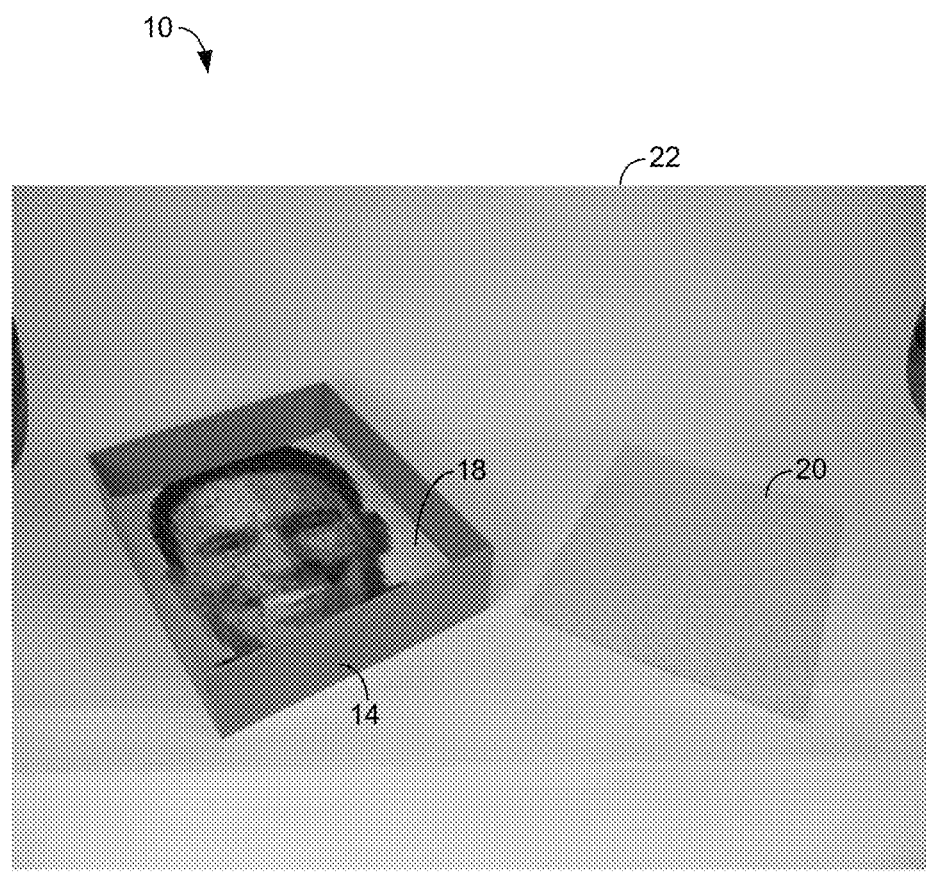
FIG. 2 illustrates a top perspective view of a pixel art crayon photo array in which a pixelated image template has been placed inside a framed box, in accordance with aspects herein.
Figure 3:
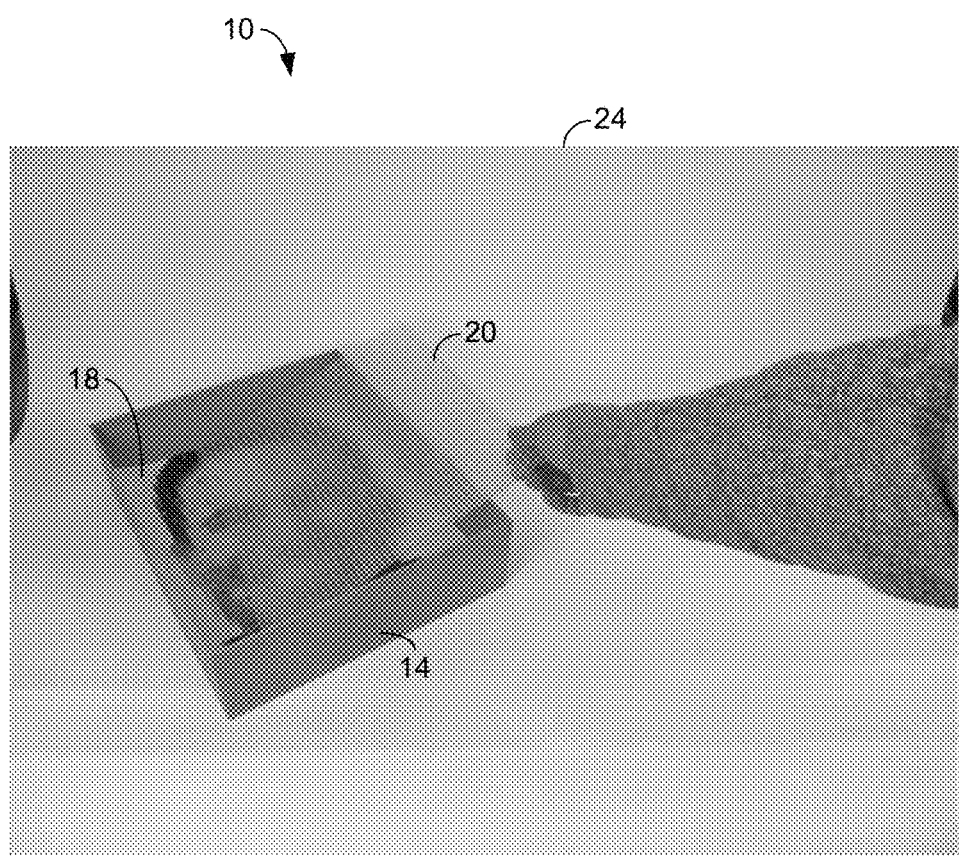
FIG. 3 illustrates a top perspective view of a pixel art crayon photo array in which a transparent plastic grid is being placed over the pixelated image template, in accordance with aspects herein.
Figure 6:
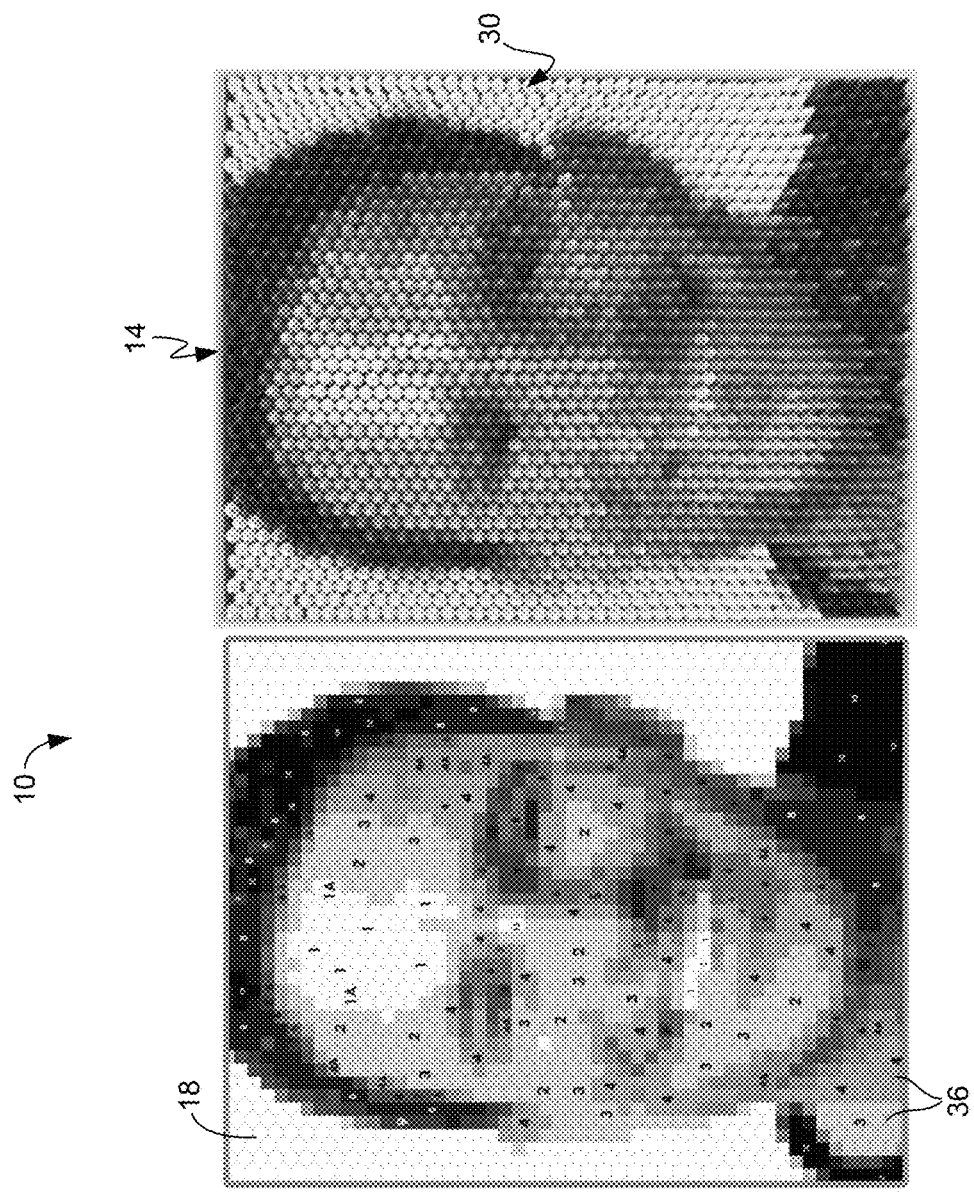
FIG. 6 is a front elevation view of a pixelated image template and a corresponding assembled pixel art crayon photo array, in accordance with aspects herein.

In further aspects herein, areas of similar color on the original image may be grouped together by the software and assigned a numerical value, such as the exemplary color assignment illustrated in FIG. 10. A new template image may be generated by the software with significantly reduced resolution compared to the original uploaded image, resulting in a pixelated appearance. In further aspects of the invention, color numbers are assigned to the appropriate areas on the template image, as shown in the example of FIG. 6. Accordingly, the user may download and print this template for placement in the frame, as shown in FIG. 2, at which time an order may be placed with the manufacturer to ship the correct colors and number of crayons to the user.

At block 96, a template, grid, frame, and correct number and color of coloring elements may be provided to a user. In aspects herein, a user may place the transparent plastic grid over the pixelated image template (e.g., FIGS. 3-4). At block 98, a user-inserted coloring elements corresponding to the particular color number on the template may be received. For example, the user may then place crayons (with the assignment of numbers to specific colors provided by the manufacturer, in one embodiment) into the corresponding/correct slots using the numbers on the underlying template as a guide (e.g., FIG. 5). For example, if number 5 corresponds to a white crayon, the user may populate all of the slots located above a region numbered "5" on the template image with white crayons. In some embodiments, the completed artwork (e.g., FIGS. 6-8) will closely resemble the original image, with reduced resolution producing a pixelated effect.

Aspects herein may also include a kit containing the frame and grid features, directions to upload/download images to/from the server, and directions on how to obtain the correct number and colors of crayons. As shown at block 100, a user may then apply a filler and/or hardening material between coloring elements. Additional embodiments include optionally filling any free space within the artwork (e.g., between crayons and/or crayons and the walls of the frame) with a filler material that may harden and further secure the artwork. In a further embodiment, a crayon photo kit may include modular frames and crayon-holding grids to allow the user to assemble a frame and grid of a size of their choice. For example, one method of assembling the modular frame and crayon-holding array is via snap/fit construction.

Figure 12:
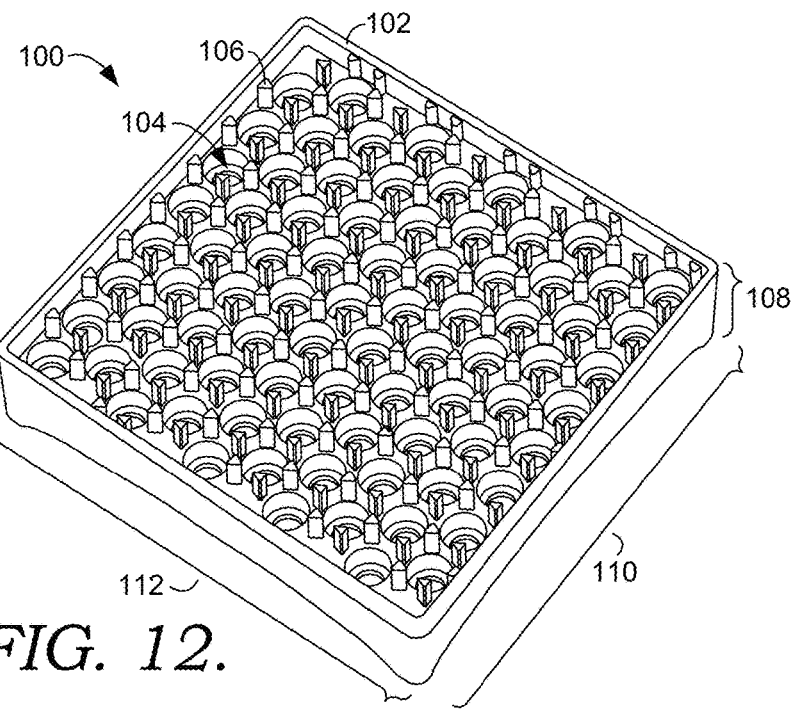
FIG. 12 is a perspective view of an assembly grid for generating a pixel art crayon photo array, in accordance with aspects herein aspect herein.

Turning next to the embodiment of FIG. 12, a perspective view of an assembly grid 100 includes a modular tray body 102 having a plurality of apertures 104 that are adjacent a plurality of triangular pegs 106 for supporting one or more cylindrical crayon bodies within the apertures 104. In one aspect, the assembly grid 100 includes a depth 108, a length 110, and a width 112 that provides a particular number of rows and columns of apertures 104, in a particular orientation, for generating at least a portion of a pixel art crayon photo array, in accordance with an aspect herein.

In the example of FIG. 12, the assembly grid 100 includes a series of organized apertures 104 that are oriented for serial insertion of at least a portion of the crayon bodies within the apertures 104. For example, a number of rows along the length 110 and a number of columns along the width 112 may provide a particular number of apertures 104 for crayon insertion, such as an assembly grid 100 including 80 apertures 104. In further aspects, the number, position, and/or placement of the corresponding and/or surrounding triangular pegs 106 may provide at least one support structure for engaging at least a portion of a crayon body inserted into an adjacent aperture 104.

Figure 7:
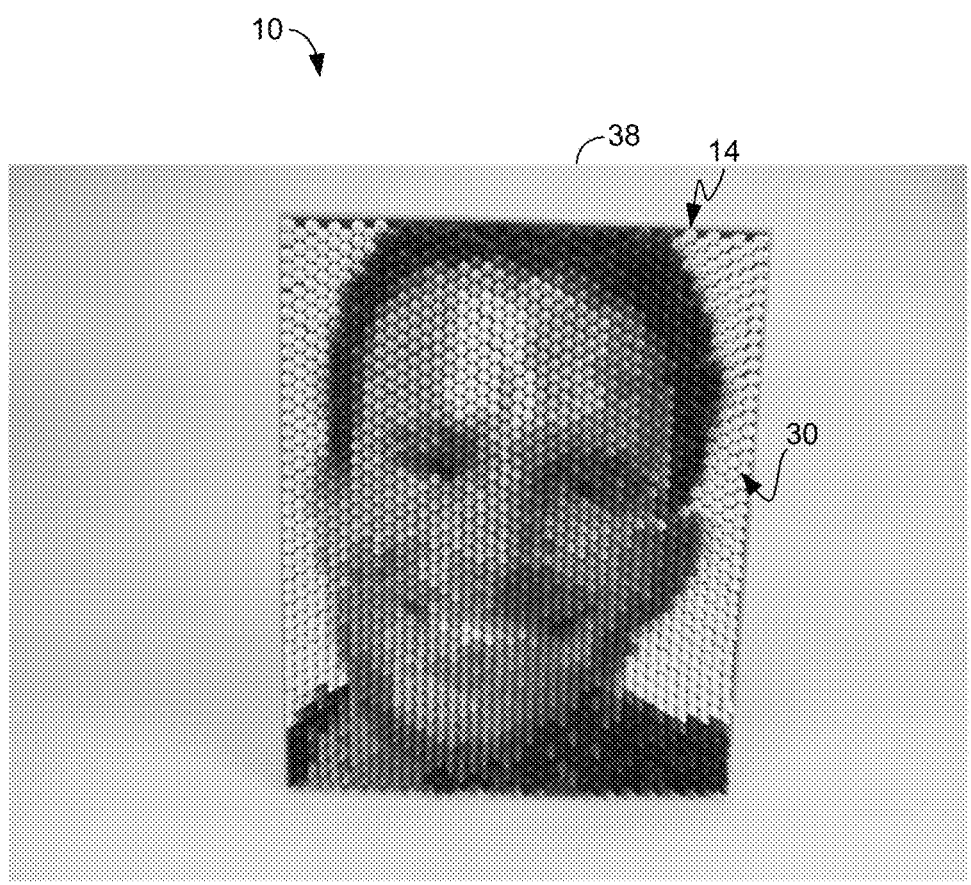
FIG. 7 is a front elevation view of an assembled pixel art crayon photo array, in accordance with aspects herein.
Figure 8:
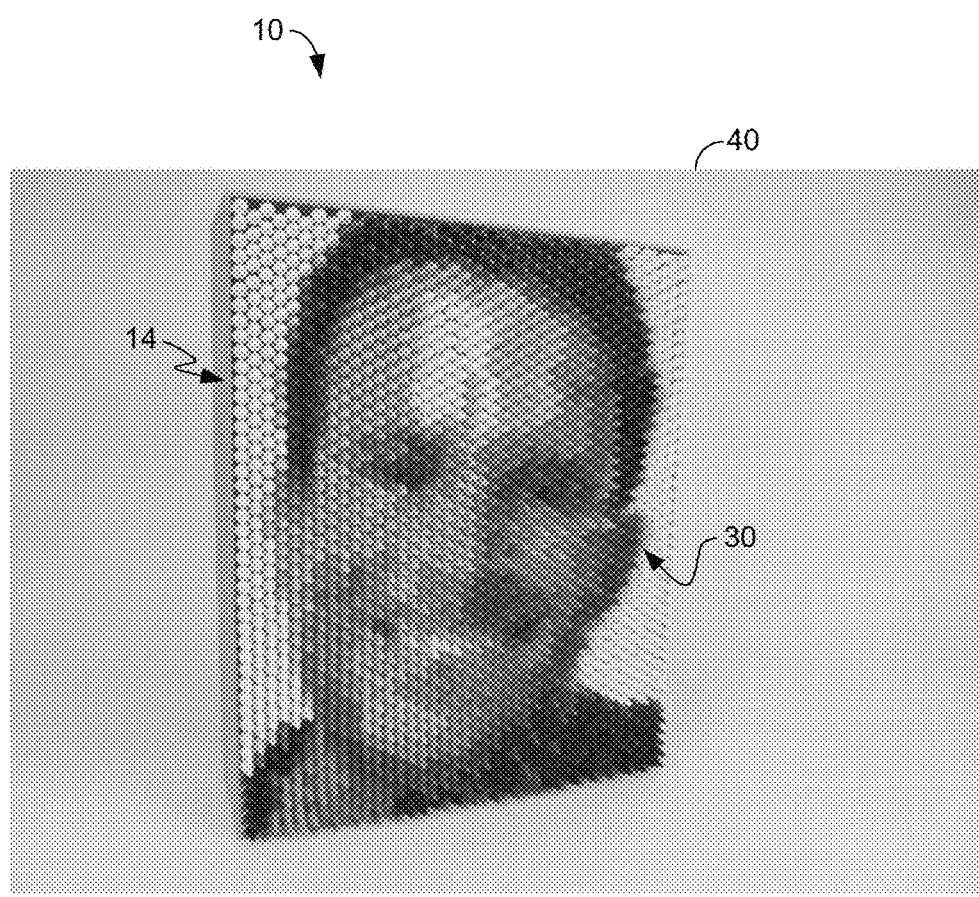
FIG. 8 is a front perspective view of an assembled pixel art crayon photo array, in accordance with aspects herein.

In one aspect, an aperture 104 of the assembly grid 100 may be configured to receive at least a portion of a crayon body tip for assembling a pixel art crayon photo array, such as the crayon array depicted in the example of FIGS. 6-8. In one aspect, multiple assembly grids 100 may be used to assemble multiple sets of crayon bodies for final assembly into the completed pixel art crayon photo array. As such, while depicted in the example of FIG. 12 as including 80 apertures 104 oriented in a herringbone and/or staggered orientation with respect to the length 110 and the width 112, the assembly grid 100 may be used to assemble a first set of crayon bodies for assembling with additional sets of crayon bodies that collectively complete the pixel art crayon photo array. Additionally, once the plurality of crayon bodies positioned within the apertures 104 of the assembly grid 100 are adhered to each other, such as by gluing at least a portion of each crayon body to one or more adjacent crayon bodies, the adhered crayon bodies from a first instance of assembly may be removed from the assembly grid 100, and a second set of crayon bodies may be inserted into the assembly grid 100 during a second instance of assembly. As such, the universal assembly grid 100 may be used to position multiple crayon bodies in a particular arrangement, maintain such arrangement during gluing of the adjacent crayon bodies, suspend the crayon bodies from a surface beneath the assembly grid 100 based on a depth 108, permit removal of the crayon bodies from the assembly grid 100 as a collective, glued segment of a pixel art image, and facilitate assembly of subsequent segments of a pixel art image with additional crayons and glue. Further, the assembled, glued segments may correspond to at least a portion of a particular pixel art image and, once complied as neighboring units, may form a completed pixel art image of crayon bodies, as further described below.

In one aspect herein, the assembly grid 100 may include a number and/or position of apertures 104 that are oriented for alignment with a numbered pixel art template. In some embodiments, each aperture 104 of an assembly grid 100 may be placed over a numbered pixel assigned to a desired image, providing a visual indication to a user regarding which color of crayon should be positioned in which aperture 104. In some embodiments, the number and/or position of apertures 104 may align with multiple, adjacent segments of a numbered pixel art template, such as a gridded/as signed template including color pixel assignments corresponding to multiple assembly grid 100 structures. For example, a pixel art template may include two grid assemblies along a horizontal axis and two grid assemblies along a vertical axis.

In this example, the 2×2 grid including four assembly grids 100 may be used to divide the 160×160 crayon matrix into individual cells for populating with particular crayon colors. In another example, a larger pixel art crayon photo array may be desired, requiring multiple assembly grids 100 worth of pixel assignments along a horizontal axis, and multiple assembly grids 100 worth of pixel assignments along a vertical axis. Such assembly grid 100 may include the staggered and/or herringbone orientation of the exemplary apertures 104 of FIG. 12, thereby increasing a contact surface between at least a portion of the adjacent crayons secured by the assembly grid 100. In a further example, a pixel art template may include 4 assembly grids 100 along a first axis and five assembly grids 100 along a second axis, with each assembly grid including 80 apertures 104, and total number of 1600 crayons assembled in a completed pixel art crayon photo array.

In this example, a first portion of a pixel-assigned photo template may include a number of assigned pixel segments corresponding to the number of apertures in the exemplary assembly grid 100. For example, a first portion of an exemplary photo template may include 80 segments corresponding to the 80 apertures along the length 110 and width 112 of the assembly grid 100. In further aspects, a second portion of an exemplary photo template may include an additional 80 segments corresponding to the 80 apertures along the length 110 and width 112 of the assembly grid 100. As such, the reusable assembly grid 100 may be used to assemble a series of adjacent crayon bodies corresponding to a first portion of a photo template, and upon adhering and removal of such crayon bodies, the assembly grid 100 may be utilized additional times to assembly further portions of the photo template. For example, a first portion of adhered, multiple crayon bodies may be assembled with crayon colors corresponding to a first portion of a pixel-assigned image, a second portion of adhered, multiple crayon bodies may be assembled with crayon colors corresponding to a second portion of a pixel-assigned image adjacent to the first portion of the pixel-assigned image. Upon adhering the first portion of crayon bodies to the second portion of crayon bodies, both assembled with and now separated from the assembly grid 100, the resulting image viewed may provide a crayon-pixelated view of the pixel-assigned image with crayon coloration providing the overall pixel art crayon photo array image.

In another embodiment, the orientation of crayon bodies within the assembly grid 100 may be secured in response to the tapered interior surface of each of the apertures 104. In some aspects, the crayon bodies secured by the assembly grid 100 are separated, at least in part, by one or more of the triangular pegs 106, such that each crayon within the apertures 104 is maintained in a consistent, parallel orientation during assembly and/or adhering. Further, the depth 108 of the assembly grid 100 may be configured to suspend the tips of crayons secured by the assembly grid 100 at a particular distance from a surface so as to not break the tips of the crayons during assembly. In another aspect, each crayon inserted into an aperture 104 includes a tapered tip corresponding to the tapered interior of the aperture 104, which further includes a particular radius and dimension such that the crayons may be assembled in a particular position for joining together as a portion of a completed pixel art image. In this example, a crayon placed vertically within an aperture 104 and secured at least in part by one or more triangular pegs 106, may then be treated with a joining feature between one or more adjacent crayons, such as glue between the crayon bodies during assembly. As shown in the example of FIG. 12, the positioning of crayon bodies along the length 110 and width 112 of the assembly grid 100 may provide a squared and/or modular final orientation of the assembled and adhered crayon bodies, which may then be used to assemble/adhere with additional other blocks of different portions within the same crayon pixel art image.

Figure 13:
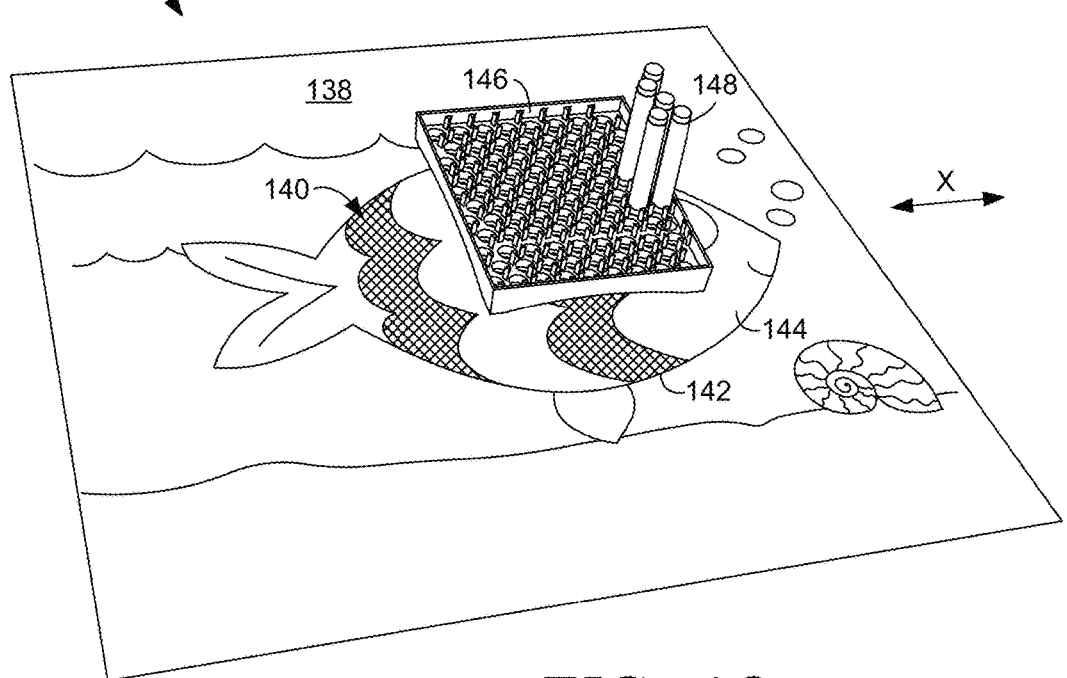
FIG. 13 is a perspective view of an assembly grid positioned with respect to a user image, for generating a pixel art crayon photo array in accordance with aspects herein.
Figure 14:
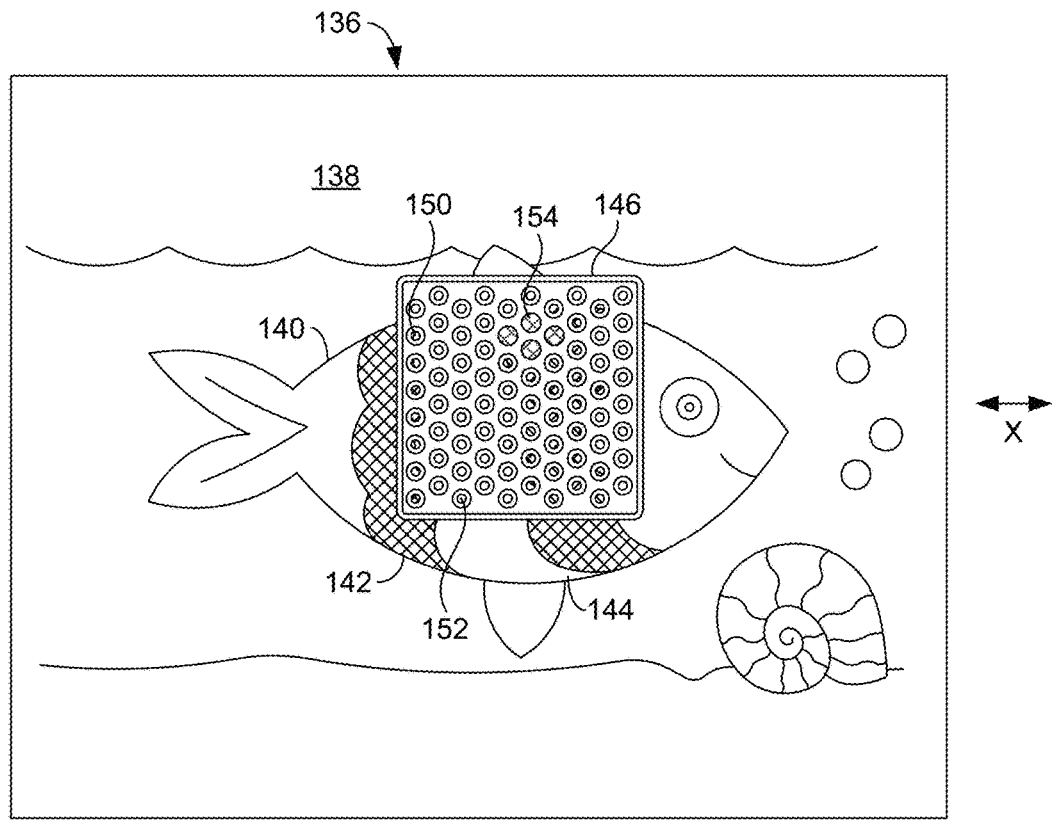
FIG. 14 is a top view of an assembly grid positioned with respect to a user image, for generating a pixel art crayon photo array in accordance with aspects herein.

In the exemplary embodiment of FIG. 13, an assembly grid 146 is positioned over a template surface 138 having a template image 140 with a first coloring feature 142 and a second coloring feature 144. In this example, the grid 146 is configured to secure multiple crayon bodies 148 in an orientation corresponding to the template image 140, based on alignment of the apertures 104 on the assembly grid 146. As shown in the top view of FIG. 14, the assembly grid 146 is positioned with respect to the user image 140 for generating a pixel art crayon photo array in accordance with an aspect herein. In this example, each aperture 104 of the grid 146 corresponds to a particular color on the template image 140, such as a first color 150 associated with first coloring feature 142, a second color 152 associated with a second coloring feature 144. In further aspects, based on a positioning of each aperture 104 and viewing of the corresponding coloring feature for each pixelated portion of the template image 140, a coloring element 154 may be positioned within the assembly grid 146, such as a crayon body 154.

Figure 15:
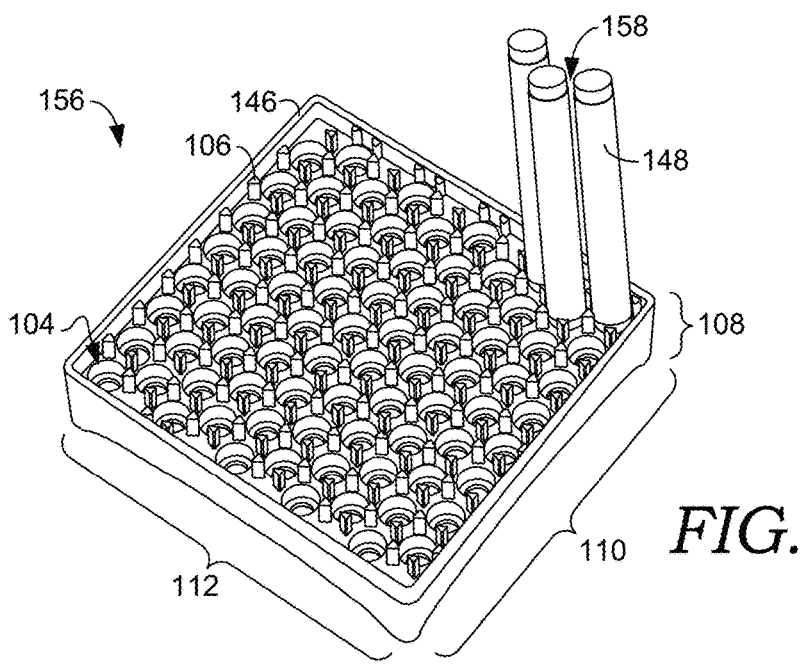
FIG. 15 is a perspective view of an assembly grid for generating a pixel art crayon photo array, in accordance with aspects herein.
Figure 16:
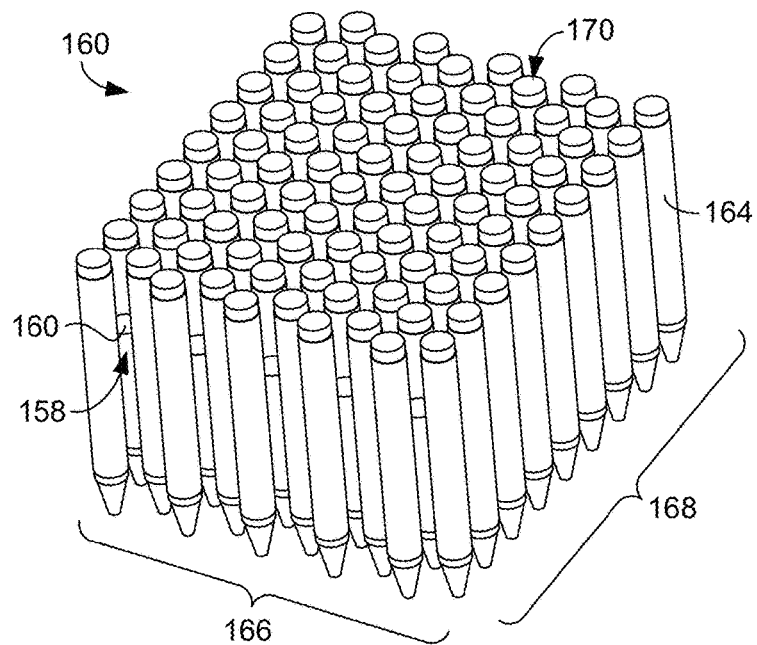
FIG. 16 is a perspective view of an adhered portion of crayon bodies positioned using an assembly grid, in accordance with an aspect herein.

In the perspective view 156 of FIG. 15, the assembly grid 146 is depicted as receiving a plurality of crayon bodies 148, with spacing 158 between each vertically aligned crayon body. As shown in FIG. 16, an adhered portion 160 of crayon bodies 164 include an attachment portion 162 within the spacing 158, such as a portion of glue or other adhesive for joining the adjacent crayon bodies 164. As such, the crayon tips along the width 166 and length 168 of the adhered portion 160 are positioned in a common plane, while the corresponding alignment 170 of each crayon end is maintained, with such consistent alignment based on adhering the crayon bodies 164 in an assembly grid 146, and subsequently removing the assembly grid (i.e., after gluing and/or adhering adjacent crayon bodies 164).

Figure 17:
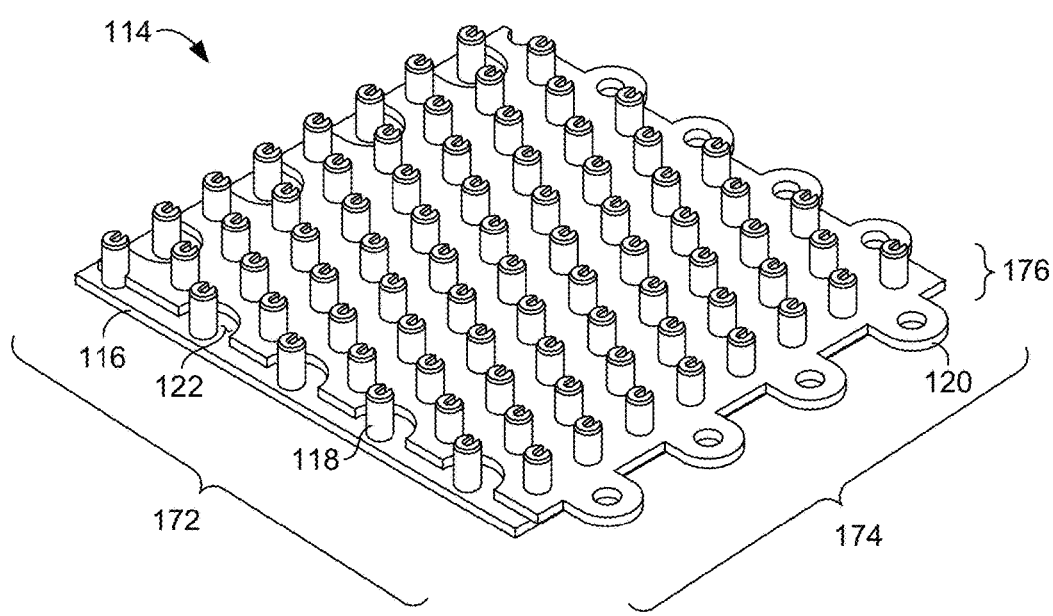
FIG. 17 is a perspective view of an assembly grid for generating a pixel art end plug array, in accordance with aspects herein.

In further embodiments of the pixel art apparatus and system, as shown in FIG. 17, an assembly grid 114 for generating a pixel art end plug array is provided in accordance with an aspect herein. In this example, the assembly grid 114 includes a grid base 116 with a plurality of pegs 118 arranged in a staggered and/or herringbone orientation, similar to the apertures 104 of the assembly grid 100 in the embodiment of FIG. 12. Further, the grid base 116 may include connecting portions 120 and receiving portions 122 for assembling multiple assembly grids 114 together to form a pixel art end plug array. As shown in the embodiment of FIG. 17, the grid base 116 may include a grid base width 172, a grid base length 174, and a depth 176 configured to generate at least a portion of a pixel art array.

Figure 18:
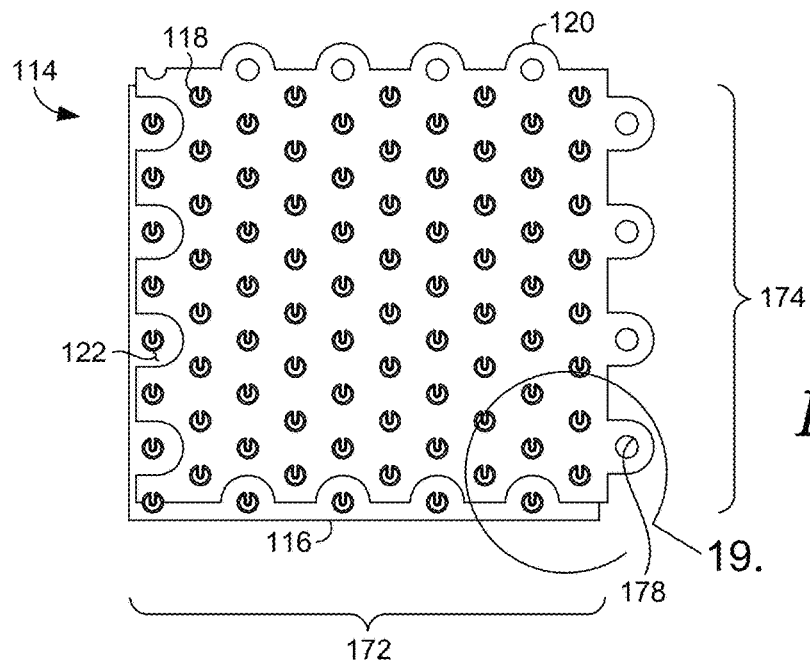
FIG. 18 is a top view of the assembly grid of FIG. 17, in accordance with aspects herein.
Figure 19:
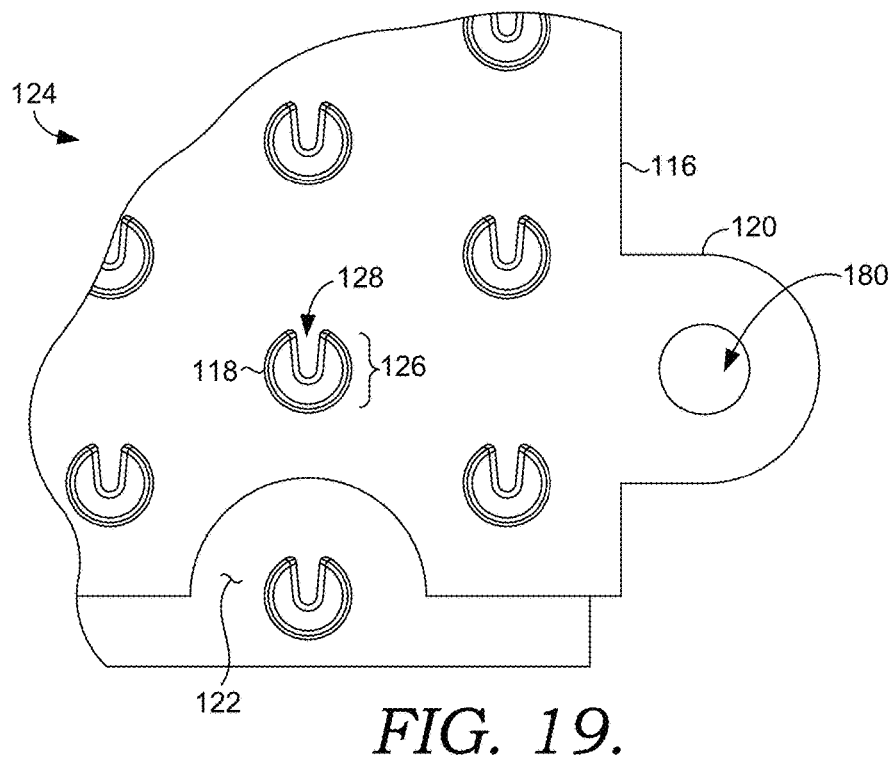
FIG. 19 is an enlarged portion of the top view of FIG. 18, in accordance with aspects herein.

In FIG. 18, the top view of the assembly grid 114 includes an additional view of the orientation of the connecting portions 120, with apertures 178, and receiving portions 122. As such, in FIG. 19, the enlarged view 124 of the peg structure 126 of each peg 118 may include at least one cavity 128 corresponding to at least a part of a marker end plug structure, and further depicts apertures 180 in the connecting portions 120 for mating to adjacent receiving portions 122. For example, in one aspect herein, the cavity 128 of the peg structure 126 may correspond to at least a part of a marker end plug interior surface. As such, the peg structure 126 may provide at least one surface for generating a snap-fit assembly of marker end plugs to the assembly grid 114.

Figure 20:
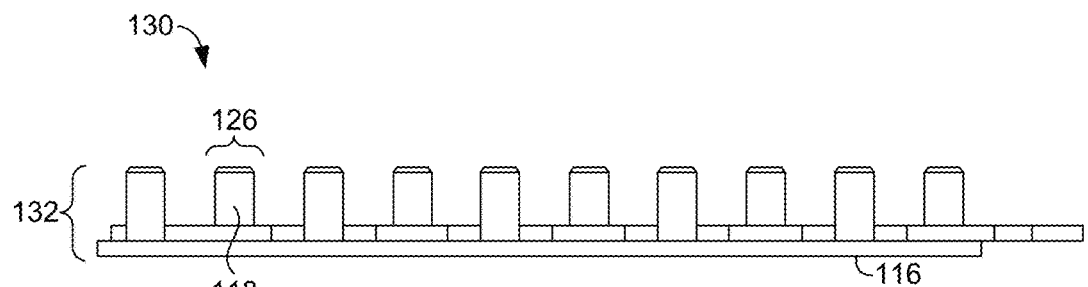
FIG. 20 is a side view of an exemplary assembly grid for generating a pixel art end plug array, in accordance with aspects herein.
Figure 21:
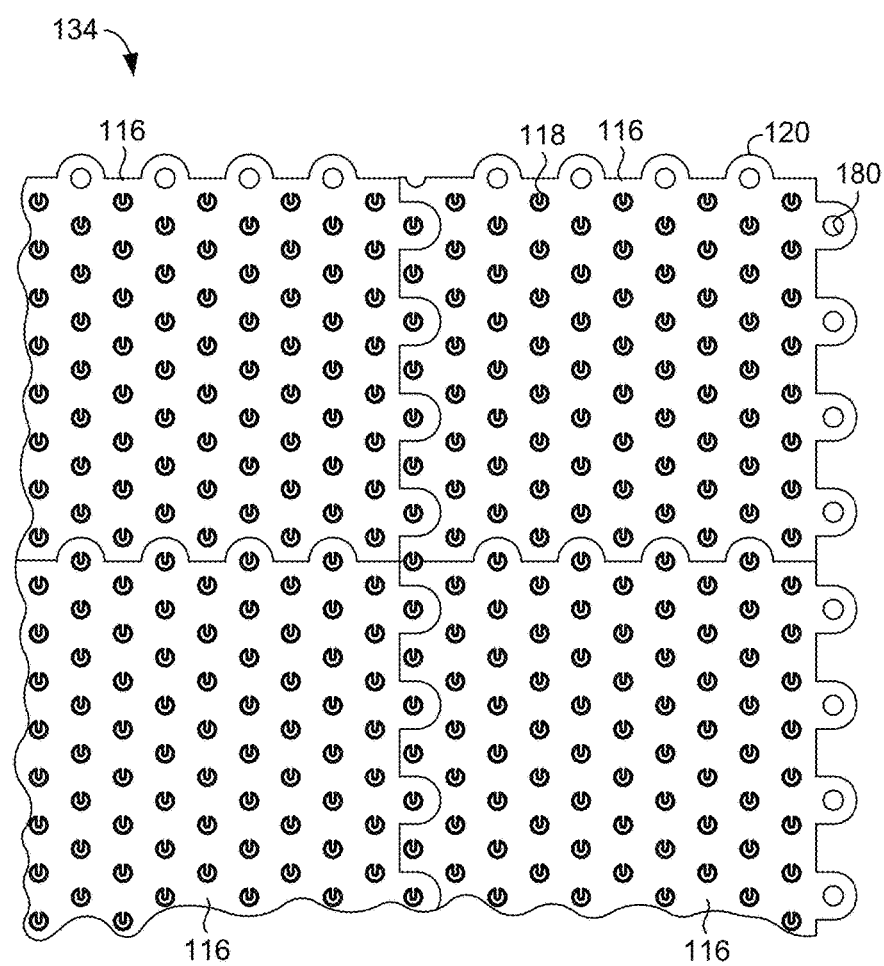
FIG. 21 is a top view of multiple coupled assembly grids for generating a pixel art end plug array, in accordance with aspects herein.
Figure 22:
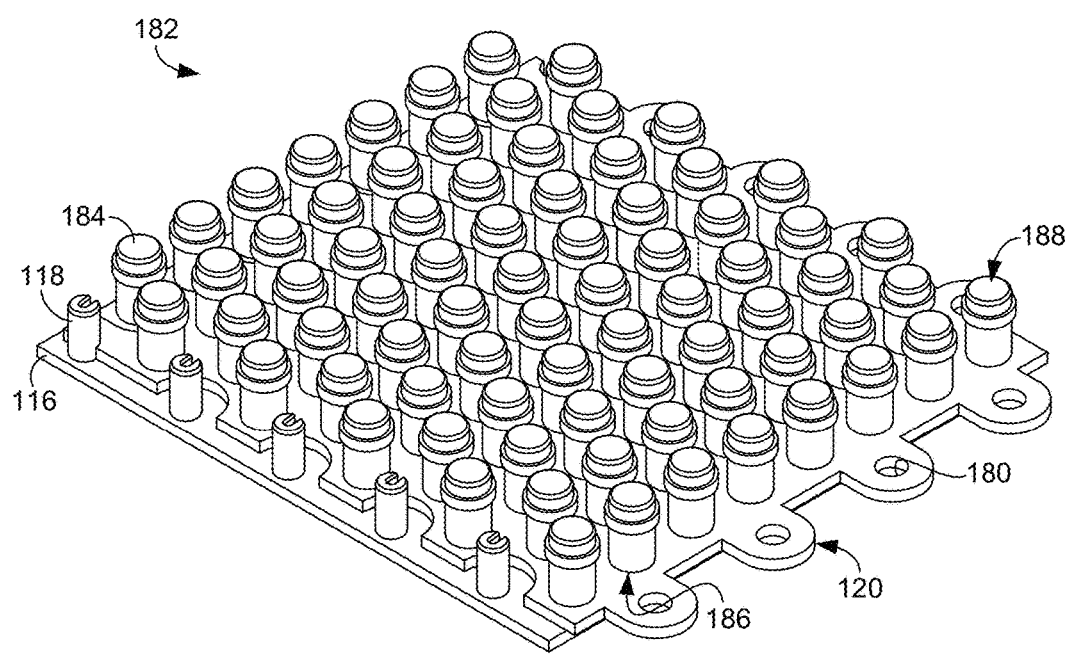
FIG. 22 is a perspective view of an exemplary assembly grid having end plugs coupled to the upper features of the assembly grid, in accordance with an aspects herein.

In FIG. 20, a flat assembly surface may be used to connect neighboring grid bases 116 such that each assembly grid 114 is in a single plane orientation 130. The assembly grid 114 may further include a grid depth 132 that corresponds to the internal diameter of a marker end plug cavity. As such, the grid depth 132 and/or peg structure 126 may provide a locking structure for securing multiple different-colored marker end plugs that collectively correspond to a multi-grid system 134 for depicting a pixel-assigned image, as shown in FIG. 21 with multiple grid bases 116 adjoined. In FIG. 22, the grid structure 182 includes multiple marker end plugs 184 coupled to adjacent peg structures of a grid base 16, and accordingly, a multi-grid system 134 may depict a completed user image, as shown in the crayon-body example of FIGS. 6-8. Upon removably coupling one or more marker end plugs 184 to the one or more pegs 118, each end plug having a coloring end 188 and an attachment and 186, the completed pixel art image may be represented by colors of marker end plugs that are assigned to corresponding colors in an original, pixel-assigned image.

Figure 23A:
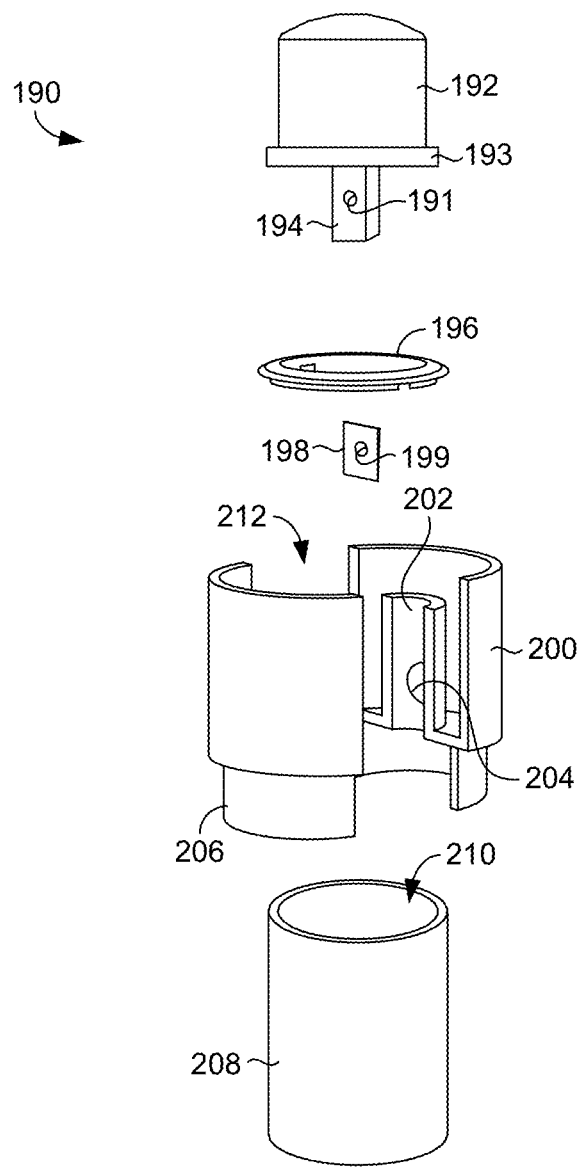
FIG. 23A is an exploded view of a crayon chopping mechanism configured to divide a crayon body into cut segments, in accordance with aspects herein.

Turning next to FIG. 23A, an exploded view of a crayon chopping mechanism 190 is configured to divide a crayon body into cut segments, in accordance with an aspect herein. In the embodiment of FIG. 23A, the crayon chopping mechanism 190 may include a plunger feature 192, a blade securing feature 194, a ring structure 196 that is configured to secure the plunger feature 192 to a collar feature 200 via the lip portion 193, a blade 198, the collar feature 200 having an interior chamber 202 with a crayon opening 204, and a coupling ring 206 that secures the collar feature 200 to a base cylinder 208 having an interior space 210 configured to receive one or more crayon segments (not shown) as they are cut or chopped from a crayon (not shown) by the crayon chopping mechanism 190. The blade 198 may be secured to the blade securing feature 194 by for example, a pin or a dowel passing through both the opening 191 at the blade securing feature 194 and the opening 199 at the blade 198. However, it is also possible that the blade 198 and the blade securing feature 194 may be integrally formed or molded together as one piece. The crayon chopping mechanism 190 in FIG. 23A is shown in an upright configuration with the base cylinder 208 on the bottom and the plunger feature 192 on top. The plunger feature 192 may be operated by gravity, for example, by inverting the crayon chopping mechanism 190 so that the base cylinder 208 is on top and the plunger feature 192 is on the bottom prior to inserting the crayon into the crayon opening 204, allowing the plunger mechanism to naturally "fall" by gravity so that the crayon opening 204 is open to receive the crayon (not shown). Once the crayon is inserted, the crayon chopping mechanism 190 may be inverted once more to return it to its upright configuration, where a downward force applied by a user on the plunger feature 192, drives at least a portion of the blade 198 through the crayon, causing a segment of the crayon to break off and fall into the interior space 210 of the base cylinder 208. As well, on the side that is opposite to the crayon opening 204, the interior chamber 202 may comprise a solid wall (not shown), to serve as a stop for the crayon when it is inserted through the crayon opening 204 into the interior chamber 202. In other words, a maximum length of the crayon that can be inserted through the crayon opening 204 into the may be determined by the solid wall. This feature allows a user to chop the crayons into substantially uniformly sized crayon segments. In other words, an overall size variation from chopped crayon segment to chopped crayon segment resulting from chopping a crayon with the crayon chopping mechanism 190 is low.

Figure 23B:
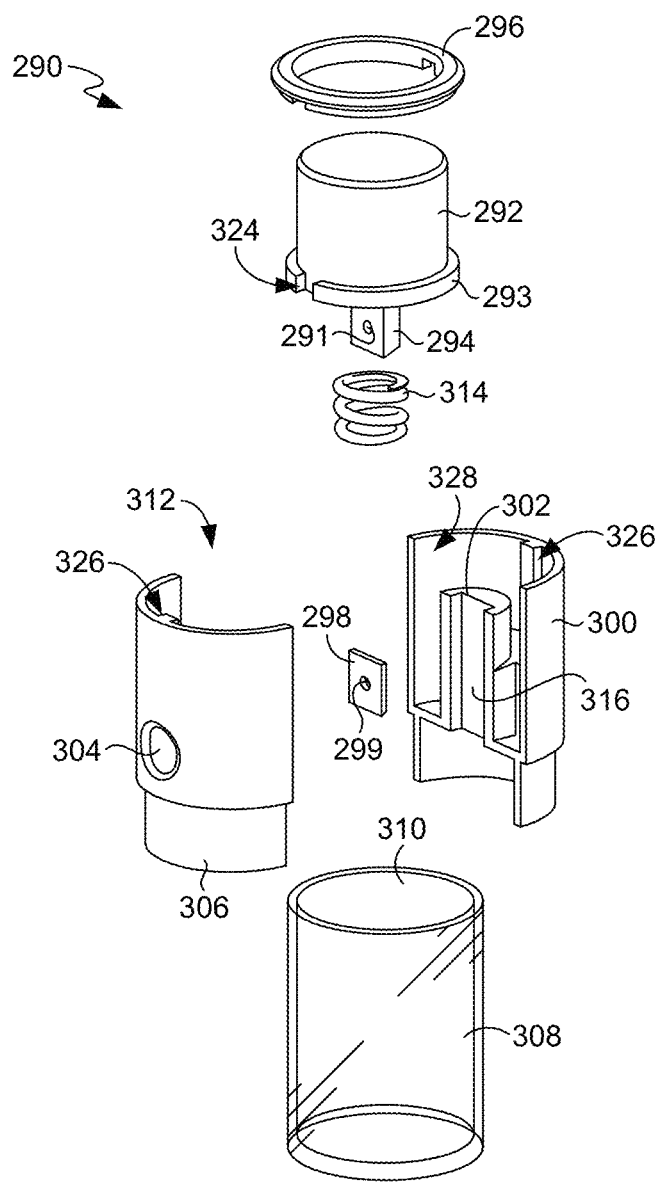
FIG. 23B is an exploded view of a spring loaded crayon chopping mechanism configured to divide a crayon body into cut segments, in accordance with aspects herein.
Figure 23C:
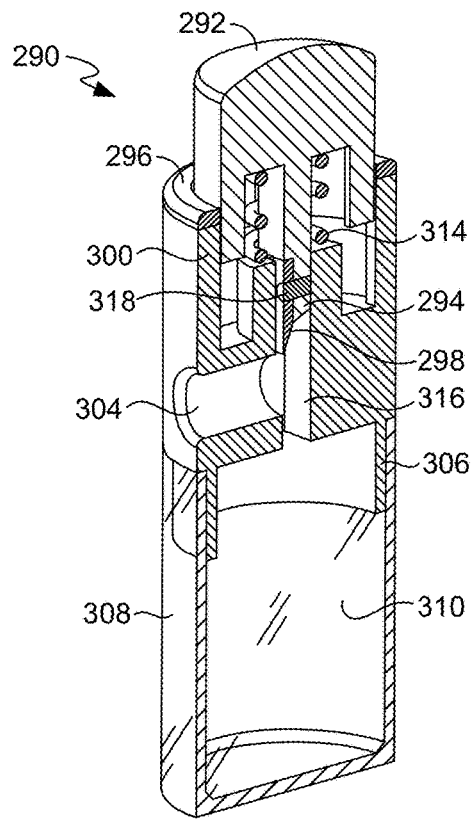
FIG. 23C is a perspective cross-sectional view of the spring loaded chopping mechanism in FIG. 23B, in accordance with aspects herein.
Figure 23D:
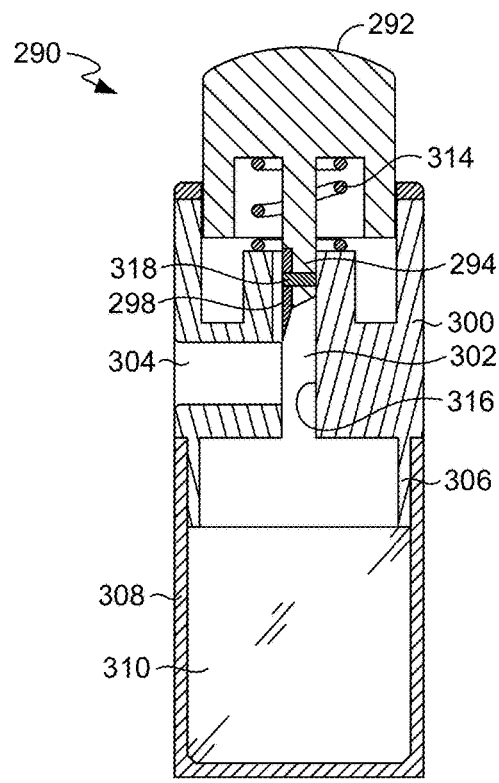
FIG. 23D is a cross-sectional view of the spring loaded chopping mechanism in FIG. 23B in a rest state, in accordance with aspects herein.
Figure 23E:
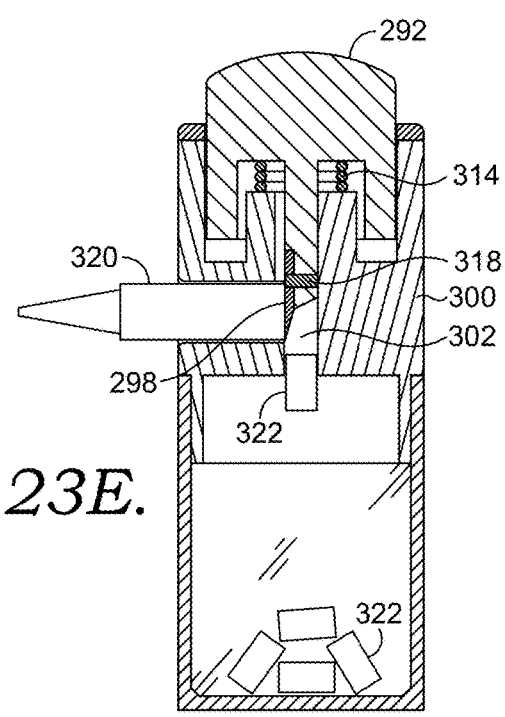
FIG. 23E is a cross-sectional view of the spring loaded chopping mechanism in FIG. 23B in an active state, in accordance with aspects herein.

Alternatively, as shown in FIG. 23B, a crayon chopping mechanism 290 may include a plunger feature 292, a blade securing feature 294, a ring structure 296 that is configured to secure the plunger feature 292 to the collar feature 300 via the lip portion 293 (as shown in the close-up view shown in FIG. 23G), a blade 298, the collar feature 300 having an interior chamber 302 with a crayon opening 304, and a coupling ring 306 to a base cylinder 308 having an interior space 310, similar to the crayon chopping mechanism 190 shown in FIG. 23A. The lip portion 293 may comprise one or more gap portions 324 that are configured to align with one or more protrusions 326 on the inner surface 328 of the interior chamber 302. The one or more protrusion 326 may fit inside of the one or more gap portions 324 to prevent the free rotation of the plunger feature 292, when the crayon chopping mechanism 290 is assembled. Additionally, the crayon chopping mechanism 290 may be provided with a spring 314 for operating the plunger feature 292. As briefly described with respect to blade 198 of crayon chopper mechanism 190, the blade 298 of the crayon chopping mechanism 290 may also be either a separate piece from the blade securing feature 294 or, the blade may be integrally formed with the blade securing feature 294, for example, by molding, sculpting, or any other suitable method and depending on the material used. For example, the blade 298 may be integrally formed with the blade securing feature 294 from a molded plastic, metal, or the like, as a unitary piece. Alternatively, the blade 298 may be a separate piece from the blade securing feature 294 and may be secured to the blade securing feature 294 by, for example, a pin 318, or other suitable means. Further, similar to the crayon chopper mechanism 190, on the side that is opposite to the crayon opening 304, the interior chamber 302 may also comprise a solid wall 316 to serve as a stop for the crayon 320 (as shown in FIG. 23E) when it is inserted through the crayon opening 304 and into the interior chamber 302 for allowing a user to chop the crayons into substantially uniformly sized crayon segments 322 (as shown in FIG. 23E). The chopped one or more crayon segments 322 may then be utilized for generating pixelated art, according to aspects herein. As shown in further detail in FIGS. 23C to 23E, the spring 314 is configured to aid in the operation of the plunger feature 292 of the crayon chopper mechanism 290. Instead of the crayon chopper mechanism 290 having to be inverted to activate the plunger feature 292 as in the case of the crayon chopper mechanism 190. In other words the spring 314 when at rest, as shown in FIGS. 23C and 23D, the spring 314 pushes the plunger feature 292 up and when a user pushes down on the plunger feature 292, compressing the spring 314, as shown in FIG. 23E, to push the blade 298 downward to make the cut through the crayon 320 to get the one or more crayon segments 322. Then, when the applied pressure is released, the spring 314 is allowed to return to its rest or equilibrium position and as the spring returns, to its rest state, it pushes the plunger feature 292 with the blade 298 upward. The user may repeat the process of inserting a crayon 320 through the crayon opening 304 and applying pressure to the plunger feature 292 to chop or cut the crayon 320 and then, releasing the plunger feature 292, as many times as desired with a plurality of crayons of different colors to obtain the one or more crayon segments 322 of multiple different colors, as needed for the generation of a piece of pixelated art.

Figure 23F:
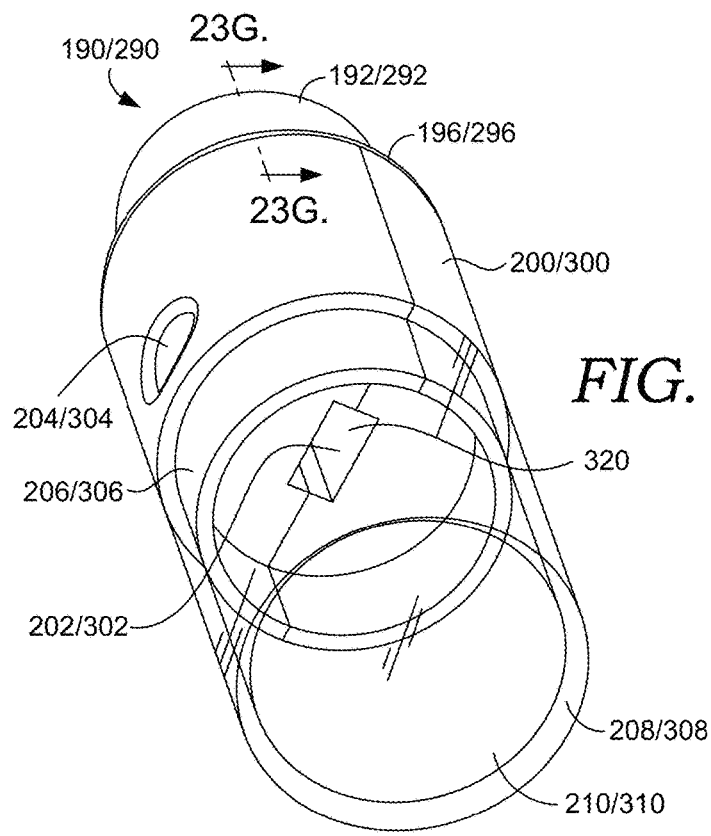
FIG. 23F is a perspective view of the constructed spring loaded chopping mechanism in FIG. 23B, in accordance with aspects herein.

FIG. 23F shows a fully constructed view of the crayon chopping mechanism 190 or 290 with the plunger feature/ 192/292 being secured to the collar feature 200/300 by the ring structure 196/296. As shown, the collar feature 200/300 further comprises a coupling ring 206/306 that couples the collar feature 200/300 to the base cylinder 208/308, where the base cylinder 208/308 comprises an interior space 210/310, where the one or more crayon segments 322 may be collected/stored after the one or more crayon segments 322 fall through the opening 320. The base cylinder 208/308 is removable so that the one or more crayon segments 322 can be retrieved from the interior space 210/310 of the base cylinder 208/308.

Figure 23H:
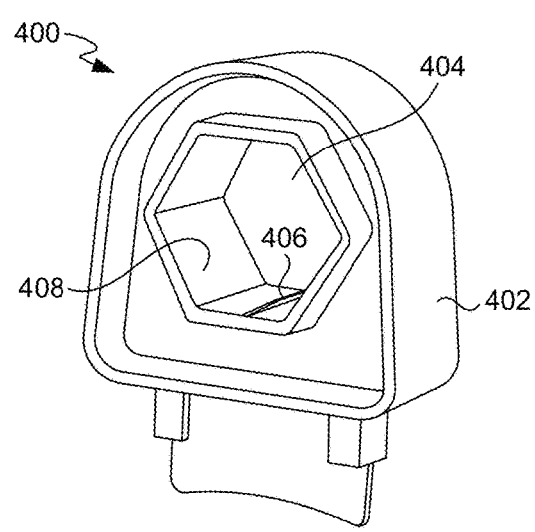
FIG. 23H is a perspective view of a crayon peeler, in accordance with aspects herein.
Figure 23G:
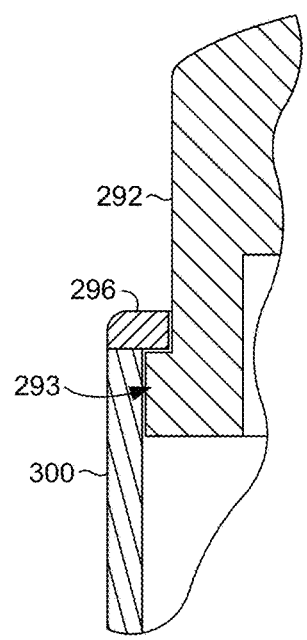
FIG. 23G is a close-up cross-sectional view of the constructed spring loaded chopping mechanism of FIG. 23F along the line 23G-23G, in accordance with aspects herein.

FIG. 23H depicts a crayon label cutter 400 having a body 402 with an opening 404, through which a crayon may be inserted. Typically, crayons come wrapped in a paper or other material label that is tightly secured to the crayon body. The label may often times be hard to peel off the crayon, especially for children. As such, the crayon label cutter 400 is provided to simplify the process of peeling a crayon. In operation, a user may push a crayon through the opening 404 of the crayon label cutter 400. As the crayon is pushed through the opening 404, the crayon label may be engaged with a cutting protrusion 406 that is only tall enough to cut through the crayon label, forming a slit on the crayon label. Once the crayon label has been cut, it may be easily peeled off of the crayon so the crayon may be chopped into one or more segments with, for example, the crayon chopping mechanisms 190 or 290, as disclosed in accordance with aspects herein. As shown in FIG. 23H, the opening 404 of the crayon label cutter may comprise a straight edged polygonal shape, such as a hexagon, even though most crayons comprise a cylindrical shape. The straight edged polygonal shape may provide enough body contact with the body of the crayon to exert pressure for cutting the label as the crayon is pushed through the opening 404, and may simultaneously reduce an area of contact between the body of the crayon and the surface 408 of the body 402 that defines the opening 404 in order to reduce friction so that the crayon may be easily pushed through the opening 404 without sticking to the surface 408. In accordance with aspects herein, both the crayon label cutter 400 and the crayon chopping mechanism 190/290 may be provided together as a kit.

Figure 24:
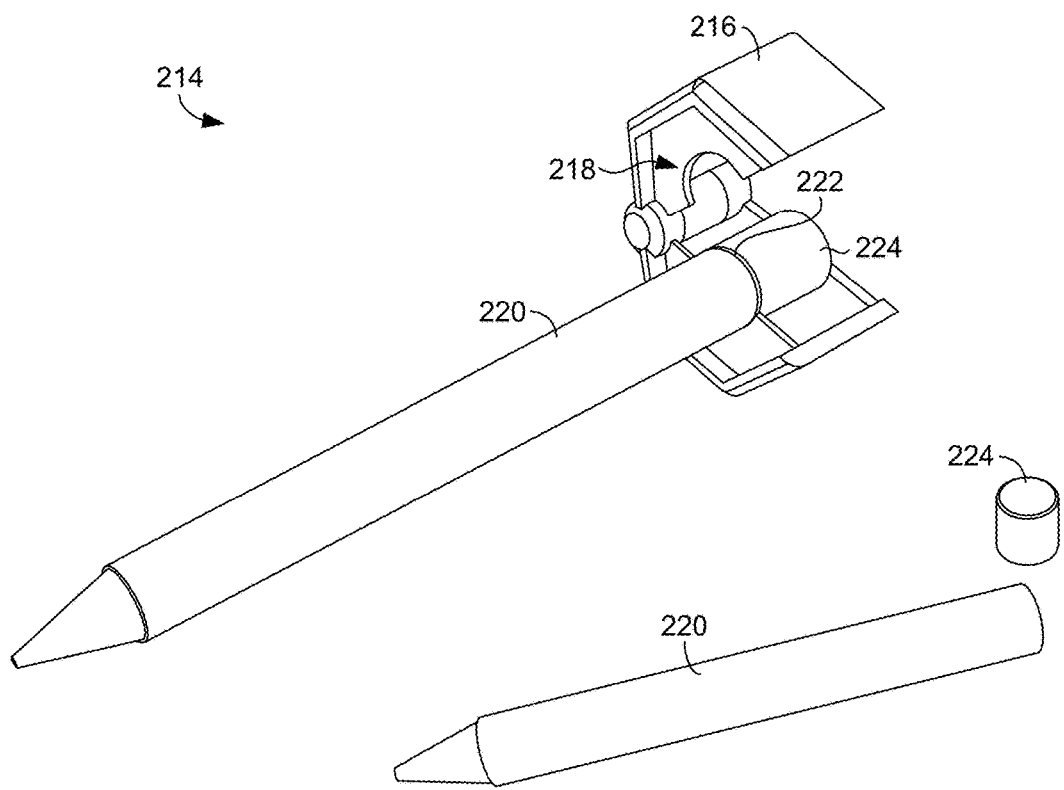
FIG. 24 is a perspective view of a crayon cutting mechanism for separating cut segments of a crayon body, in accordance with aspects herein.
Figure 25:
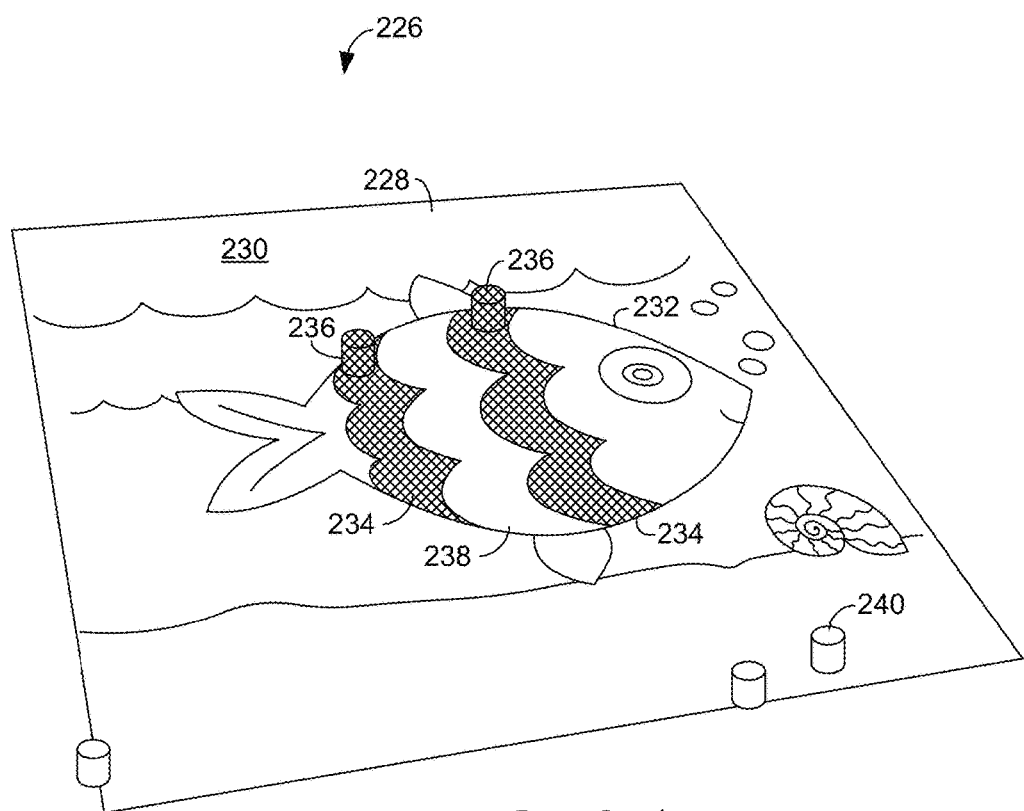
FIG. 25 is a perspective view of a coloring template associated with multiple crayon segments having colors corresponding to the coloring template image, in accordance with aspects herein.
Figure 26:
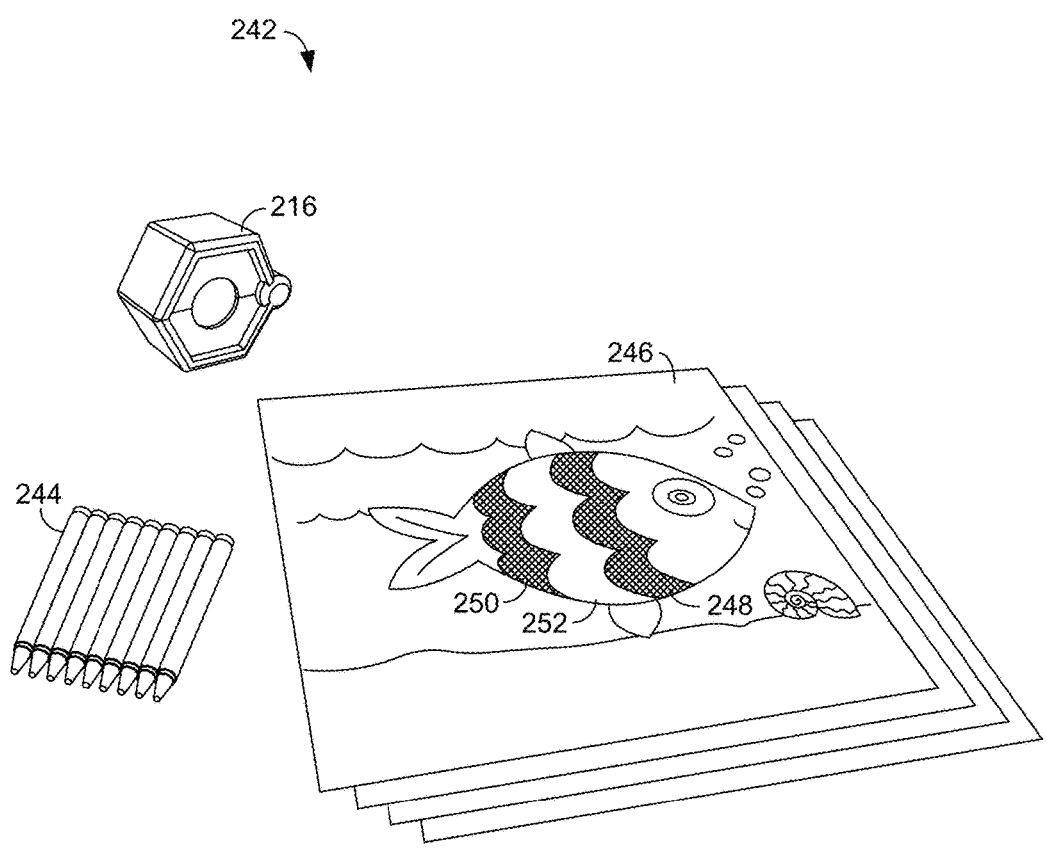
FIG. 26 is a perspective view of a coloring template kit having a crayon cutting mechanism, crayon bodies, and coloring template pages having coloring template images associated with the colors of the crayon bodies, in accordance with aspects herein.

In the embodiment of FIG. 24, a perspective view of a crayon cutting mechanism 214 for separating cut segments of a crayon body is provided. The crayon cutting mechanism 214 may include a holder 216 having an internal edge 218 that contacts a crayon body 220 to imprint a break line 222 and separate an end segment 224. As such, one or more segments of a crayon body 220 may be used to generate a pixelated art image, such as the coloring template 226 of FIG. 25 having a template 228 with a template image 230 and coloring elements 234 corresponding to crayon color 236, and coloring elements 238 corresponding to crayon color 240. As such, the template 228 may be associated with multiple crayon segments having colors corresponding to the various colors within coloring template image, in accordance with an aspect herein. In FIG. 26, a perspective view of a coloring template kit 242 having a crayon cutting mechanism with a crayon holder 216, crayon bodies 244, and coloring templates 246 is provided, with coloring elements 248, 250, and 252.

Figure 27:
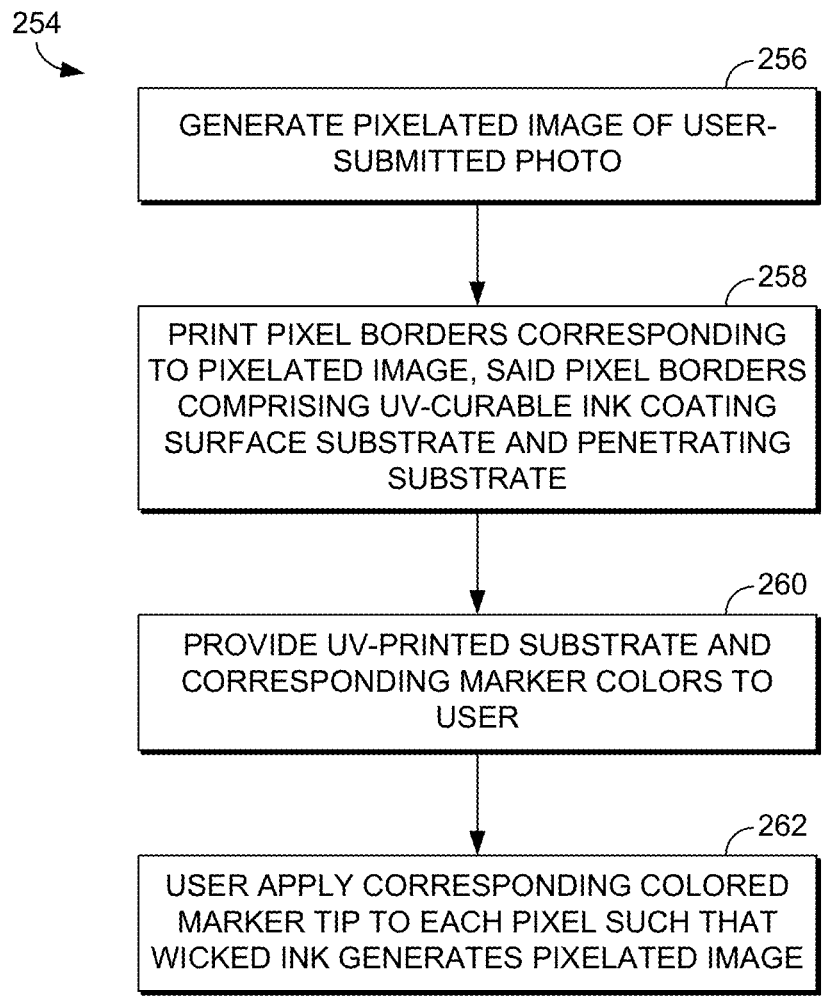
FIG. 27 is a flow diagram of a method for generating a pixel art image based on applying marker ink to a substrate having a pixel-assigned surface, in accordance with aspects herein.

Referring finally to FIG. 27, a flow diagram of a method 254 for generating a pixel art image based on applying marker ink to a substrate having a pixel-assigned surface is provided in accordance with an aspect herein. At block 256, a pixelated image of a user-submitted photo is generated. In one aspect, a user-submitted image, such as a photo, is processed to generate a pixelated image for pixel-art generation. At block 258, pixel borders corresponding to the pixelated image are printed, with the pixel borders comprising UV-curable ink coating surface substrates that penetrate the substrate. For example, the borders of each pixel may be "printed" using UV-curable ink on a particular surface, such as a specialty paper/fabric. In some embodiments, the ink may not only coat the surface of the substrate, but also soak through to the other side of the substrate.

In further embodiments, curing of the ink under UV light may result in a crosslinking reaction hardening the resins in the ink. The cured ink that is within the matrix of the substrate may then act as a physical barrier for the next steps in this process. At block 260, a UV-printed substrate and corresponding set of marker colors may be provided to a user. Once the user receives the UV-printed substrate, along with the corresponding colors of markers or other ink-applying mechanism, a user may apply a corresponding colored marker tip to each pixel such that the ink is wicked and generates the pixelated image, at block 262. For example, a marking instrument containing a water-based ink may be matched to the color of each pixel. A user may then hold the tip of the marker adjacent the pixel to allow the ink to flow into the substrate, flowing and/or spreading via wicking into the substrate. In some aspects, the UV-printed lines/pixel borders physically prevent the ink from spreading beyond into surrounding pixels.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A crayon chopping mechanism kit for chopping a crayon, the crayon chopping mechanism kit comprising:
   a crayon chopper comprising:
      a plunger feature having a blade securing feature with a blade;
      a ring structure; and
      a collar feature having an interior chamber and a crayon opening configured to receive a crayon; and
   a crayon label cutter comprising:
      an opening for receiving a labeled crayon; and
      a cutting protrusion located on a surface of the crayon label cutter defining the opening, wherein the cutting protrusion is configured to cut a label of a crayon as the labeled crayon is passed through the opening.

2. The crayon chopping mechanism kit of claim 1, wherein the collar feature comprises a coupling ring configured to couple the collar feature of the crayon chopper to a base cylinder, wherein the base cylinder comprises an interior space configured to receive and store one or more chopped crayon segments.

3. The crayon chopping mechanism kit of claim 2, wherein the base cylinder is removable.

4. The crayon chopping mechanism kit of claim 1, wherein the blade and the blade securing feature are integrally formed as a unitary piece.

5. The crayon chopping mechanism kit of claim 1, wherein the blade is secured to the blade securing feature by a pin inserted through a first opening in the blade, and through a second opening in the blade securing feature.

6. The crayon chopping mechanism kit of claim 1, wherein the blade is formed from a plastic material.

7. The crayon chopping mechanism kit of claim 1, wherein the interior chamber of the collar feature comprises a wall for limiting an amount of the crayon that can be inserted into the interior chamber and for assisting a user in chopping the crayon into uniform size pieces.

8. The crayon chopping mechanism kit of claim 1, further comprising a spring.

9. The crayon chopping mechanism kit of claim 1, wherein the opening of the crayon label cutter comprises a straight edged polygonal shape.

10. The crayon chopping mechanism kit of claim 9, wherein the straight edged polygonal shape is a hexagonal shape.

11. The crayon chopping mechanism kit of claim 1 further comprising a plurality of crayons.

* * * * *

UNITED STATES PATENT AND TRADEMARK OFFICE
CERTIFICATE OF CORRECTION

PATENT NO. : 10,471,617 B2  
APPLICATION NO. : 15/789636  
DATED : November 12, 2019  
INVENTOR(S) : Volzer et al.

Page 1 of 1

It is certified that error appears in the above-identified patent and that said Letters Patent is hereby corrected as shown below:

On the Title Page

Item (72) Inventor is corrected to read:  
-- David Volzer, Easton, PA;  
Douglas A. Brand, Easton, PA;  
Craig Skinner, Easton, PA;  
Anthony P. Monzo, Easton, PA --.

Signed and Sealed this  
Twenty-fourth Day of March, 2020

Andrei Iancu  
*Director of the United States Patent and Trademark Office*